(12) United States Patent
Shimatani et al.

(10) Patent No.: US 12,320,416 B2
(45) Date of Patent: Jun. 3, 2025

(54) UTILITY VEHICLE

(71) Applicant: KAWASAKI MOTORS, LTD., Hyogo (JP)

(72) Inventors: Kengo Shimatani, Kobe (JP); Ayumu Hamada, Akashi (JP); Takahiro Jyouzaki, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 495 days.

(21) Appl. No.: 17/693,739

(22) Filed: Mar. 14, 2022

(65) Prior Publication Data

US 2022/0356939 A1 Nov. 10, 2022

Related U.S. Application Data

(63) Continuation-in-part of application No. 17/314,587, filed on May 7, 2021, now Pat. No. 11,919,587.

(51) Int. Cl.
*F16H 57/04* (2010.01)
*F16H 57/02* (2012.01)
*F16H 57/027* (2012.01)

(52) U.S. Cl.
CPC ....... *F16H 57/0416* (2013.01); *F16H 57/027* (2013.01); *F16H 57/0417* (2013.01); *F16H 57/0489* (2013.01); *F16H 2057/02056* (2013.01)

(58) Field of Classification Search
CPC ............... F16H 57/0416; F16H 57/027; F16H 57/0417; F16H 57/0489; F16H 2057/02056
See application file for complete search history.

(56) References Cited

U.S. PATENT DOCUMENTS

| | | | | |
|---|---|---|---|---|
| 3,820,327 | A * | 6/1974 | Henault | F01N 3/2889 60/299 |
| 6,832,872 | B2 * | 12/2004 | Koelm | E01C 19/00 404/108 |
| 7,059,071 | B2 * | 6/2006 | Hanafusa | E01H 5/04 37/249 |
| 7,191,753 | B2 * | 3/2007 | Sagara | F01P 1/02 181/204 |
| 8,439,141 | B2 | 5/2013 | Bessho et al. | |
| 10,704,438 | B2 * | 7/2020 | Swab | F01N 3/05 |
| 10,920,639 | B2 * | 2/2021 | Kurasawa | F01N 13/08 |
| 2006/0011401 | A1 | 1/2006 | Nakamura et al. | |
| 2007/0227793 | A1 | 10/2007 | Nozaki et al. | |
| 2010/0186395 | A1 * | 7/2010 | Yang | F01N 1/14 60/311 |

(Continued)

FOREIGN PATENT DOCUMENTS

| | | | | |
|---|---|---|---|---|
| CN | 104564327 | | 4/2015 | |
| DE | 102004009376 | A1 * | 9/2004 | ............... F01N 3/22 |

(Continued)

OTHER PUBLICATIONS

Office Action issued Dec. 2, 2024 in U.S. Appl. No. 17/693,739.

*Primary Examiner* — Jacob B Meyer
(74) *Attorney, Agent, or Firm* — Wenderoth, Lind & Ponack, L.L.P.

(57) ABSTRACT

A utility vehicle including an engine; an exhaust pipe through which exhaust gas is discharged from the engine, the exhaust pipe being connected to the engine; and an air guide that guides outside air toward the exhaust pipe.

15 Claims, 13 Drawing Sheets

(56) References Cited

U.S. PATENT DOCUMENTS

| | | | |
|---|---|---|---|
| 2011/0099990 A1* | 5/2011 | Lang | F01N 13/082 |
| | | | 60/320 |
| 2011/0239636 A1* | 10/2011 | Brunet | F01N 3/021 |
| | | | 60/320 |
| 2015/0128578 A1* | 5/2015 | Helferich | F01N 13/082 |
| | | | 60/320 |
| 2016/0332676 A1 | 11/2016 | Miller et al. | |
| 2020/0122560 A1 | 4/2020 | Ward et al. | |
| 2022/0355877 A1 | 11/2022 | Jyouzaki | |
| 2022/0356939 A1* | 11/2022 | Shimatani | F16H 57/0416 |
| 2024/0239184 A1* | 7/2024 | Tokuda | B60K 11/06 |

FOREIGN PATENT DOCUMENTS

| | | | | |
|---|---|---|---|---|
| WO | WO-2004078571 A1 * | 9/2004 | | B62J 23/00 |
| WO | WO-2013079523 A1 * | 6/2013 | | F01N 13/082 |
| WO | WO-2018030110 A1 * | 2/2018 | | B62H 1/02 |
| WO | WO-2018030302 A1 * | 2/2018 | | F01P 1/02 |

* cited by examiner

UTILITY VEHICLE

TECHNICAL FIELD

The present disclosure relates to a utility vehicle.

RELATED ART

US 2006/0011401 discloses an uneven ground traveling vehicle including an engine, a belt transmission, and an exhaust system for discharging exhaust gas from the engine. The belt transmission includes an intake duct for introducing cooling air and an exhaust duct for discharging exhaust air rearward after cooling of the transmission. The exhaust system includes an exhaust pipe mounted on the engine, and an exhaust muffler connected to the downstream side of the exhaust pipe and positioned at a rear portion of the vehicle. In the vehicle, exhaust air discharged from the exhaust duct is blown around the exhaust muffler. This prevents hot air staying around the exhaust muffler from flowing toward an occupant.

SUMMARY

An object of the present disclosure is to provide a utility vehicle capable of suppressing an influence of heat radiated from an exhaust system on surroundings of the exhaust system (hereinafter, referred to as heat damage).

The present disclosure provides a utility vehicle including:
  an engine;
  an exhaust pipe through which exhaust gas is discharged from the engine, the exhaust pipe being connected to the engine; and
  an air guide that guides outside air toward the exhaust pipe.

According to the present disclosure, since the exhaust pipe is cooled by outside air guided by the air guide, heat damage to the surroundings of the exhaust pipe by the exhaust pipe is suppressed. In particular, since an exhaust system located on the upstream side of an exhaust muffler is cooled, the exhaust system can be more effectively cooled, and heat damage to the surroundings of the exhaust system is more effectively suppressed. Furthermore, a deposit that may be deposited on the exhaust pipe is blown off and removed by outside air guided from the air guide.

BRIEF DESCRIPTION OF THE DRAWINGS

The foregoing and the other features of the present disclosure will become apparent from the following description and drawings of an illustrative embodiment of the disclosure in which.

DETAILED DESCRIPTION OF EMBODIMENTS

A vehicle 100 according to an first embodiment of the present disclosure will be described with reference to FIGS. 1 to 7. The vehicle 100 according to the present embodiment is a utility vehicle. In the description below, the front-rear direction, left-right direction, and vertical direction as seen from the driver will be referred to as the front-rear direction, left-right direction, and vertical direction of the vehicle 100 and each component.

Figure 1:
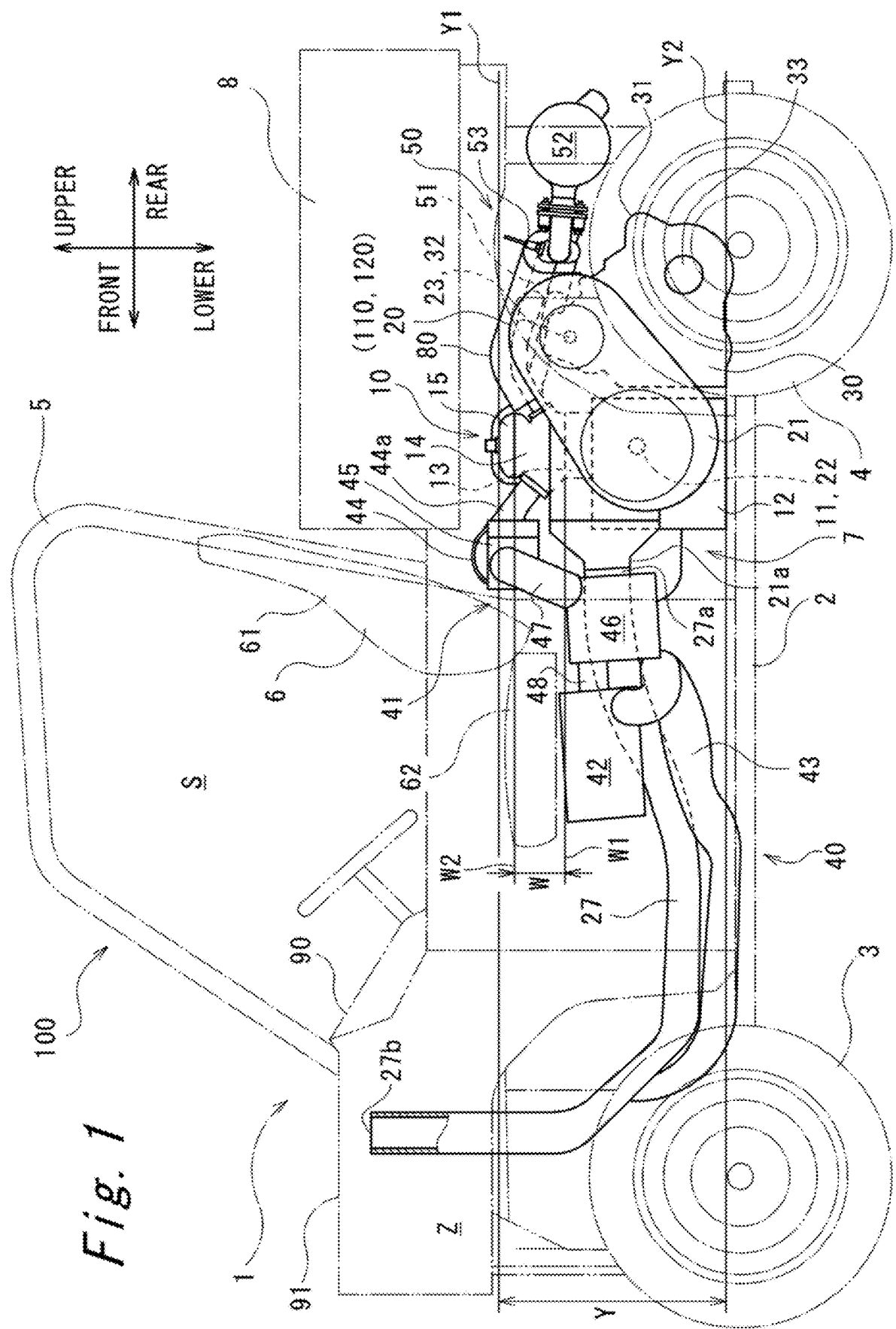
FIG. 1 is a left side view schematically illustrating a vehicle according to a first embodiment of the present disclosure.

FIG. 1 is a left side view of the vehicle 100. As shown in FIG. 1, the vehicle 100 has a vehicle body 1 and a powertrain mechanism 7 mounted on the vehicle body 1. Note that, in FIG. 1, the vehicle body 1 is shown by a chain double-dashed line, and the powertrain mechanism 7 is shown by a solid line.

The vehicle body 1 includes a vehicle body frame 2 that constitutes a framework. In the vehicle body 1, a pair of left and right front wheels 3 are disposed on both sides of the front portion of the vehicle body frame 2, and a pair of left and right rear wheels A are disposed on both sides of the rear portion of the vehicle body frame 2. Riding space S is located between the front wheel 3 and the rear wheel 4. The riding space S is surrounded by a ROPS (Rollover Protective Structure) 5.

Figure 2:
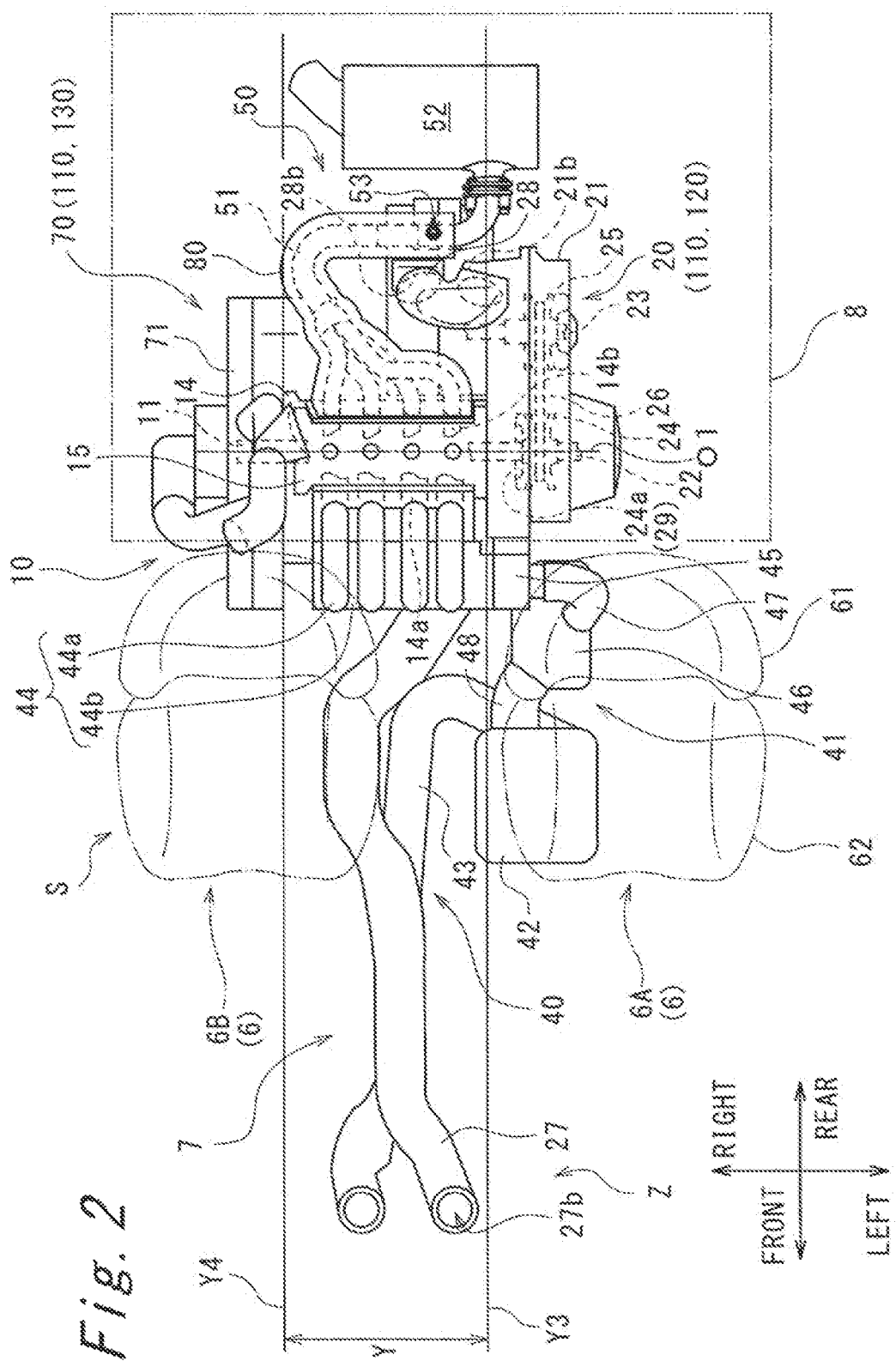
FIG. 2 is a top view schematically illustrating a powertrain mechanism.

A seat 6 is disposed in the riding space S. FIG. 2 is a top view of the powertrain mechanism 7. In FIG. 2, the seat. 6 and a cargo bed 8 are both shown by a chain double-dashed line. As illustrated in FIG. 2, the seat 6 includes a driver's seat 6A located on the left side of the riding space S and a passenger seat 6B located on the right side of the riding space S. The seat 6 includes a seat back 61 that supports the back of an occupant from behind, and a seat cushion 62 on which an occupant is seated. The cargo bed 8 is located behind the seat 6 of a vehicle body 1. As illustrated in FIG. 1, the powertrain mechanism 7 is arranged below the cargo bed 8. The powertrain mechanism 7 includes an engine 10, a CVT (Continuously Variable Transmission) 20, and a transmission 30. In the vehicle 100, the rotational torque output from the engine 10 is changed in rotation speed by the CVT 20 and the transmission 30 and transmitted to a front wheel 3 and a rear wheel 4.

Hereinafter, the powertrain mechanism 7 will be described. As illustrated in FIG. 2, the powertrain mechanism 7 further includes an intake system 40, an exhaust system 50, and an engine auxiliary unit 70.

In the powertrain mechanisms 7, the CVT 20 and the engine auxiliary unit 70 constitute a power transmission unit 110 in which the power is transmitted from the engine 10. Further, the CVT 20 constitutes a driving force transmission unit 120 in which the power is transmitted from the engine 10 as the driving force for traveling. Further, the engine auxiliary unit 70 constitutes an auxiliary transmission unit 130 in which the power from the engine 10 is transmitted as a driving force for an engine auxiliary 71 attached to the engine 10.

The engine 10 has a crankshaft 11 as an output shaft from which rotational torque is output. In the present embodiment, the engine 10 is a four-cycle in-line four cylinder engine in which a central axis O1 of the crankshaft 11 extends in the vehicle width direction. As illustrated in FIG. 1, the engine 10 has a crankcase 12, a cylinder 13, a cylinder head 14, and a cylinder head cover 15 in this order from the bottom.

The crankcase 12 rotatably supports the crankshaft 11. The cylinder 13 is coupled to the upper surface of the crankcase 12. The cylinder head 14 is coupled to the upper surface of the cylinder 13. As illustrated in FIG. 2, the cylinder head 14 has four intake ports 14a on the front side and four exhaust ports 14b on the rear side. The cylinder head cover 15 is fixed to the upper surface of the cylinder head 14.

The CVT 20 is disposed adjacent to the left side of the engine 10. The CVT 20 has a CVT housing 21 constituting an outer shell, and a CVT input shaft 22, a CVT output shaft 23, a drive pulley 24, a driven pulley 25, and an endless belt 26 accommodated inside the CVT housing 21.

The CVT input shaft 22 extends in the vehicle width direction and is connected to the crankshaft 11 so as to be able to transmit power. As illustrated in FIG. 1, the CVT output shaft 23 extends in the vehicle width direction behind and above the CVT input shaft 22. The CVT 20 extends in a direction that is inclined upward toward the rear in a side view.

As illustrated in FIG. 2, the drive pulley 24 is disposed on the CVT input shaft 22 so as to integrally rotated therewith. The driven pulley 25 is disposed on the CVT output shaft 23 so as to integrally rotate therewith. The endless belt 26 is wound over between the drive pulley 24 and the driven pulley 25. In the CVT 20, the drive rotation inputted from the crankshaft 11 is transmitted to the CVT input shaft 22, has the speed changed through the drive pulley 24, the driven pulley 25, and the endless belt 26, and is output from the CVT output shaft 23.

As illustrated in FIG. 1, a CVT housing 21 has a housing intake opening 21a at the front. The housing intake opening 21a opens forward. A CVT intake duct 27 is connected to the housing intake opening 23a. As illustrated in FIG. 2, the CVT housing 21 has a housing exhaust opening 21b at the rear. The housing exhaust opening 21b opens upward, more specifically, in a direction inclined forward and inward, that is, to the right side in the vehicle width direction toward the upper side. A CVT exhaust duct 28 that protrudes toward the engine 10, that is, the right side in the vehicle width direction and exhausts rearward is connected to the housing exhaust opening 21b.

The CVT 20 takes in outside air from the housing intake opening 21a into the inside of the CVT housing 21 through the CVT intake duct 27, and the inside of the CVT housing 21 is cooled by the taken-in outside air. Next, the outside air that has cooled the inside of the CVT housing 21 is discharged from the housing exhaust opening 21b to the outside of the CVT housing 21 through the CVT exhaust duct 23 to the exhaust system 50. In the present embodiment, a drive pulley 24 has a plurality of fins 24a that rotate integrally, and the fins 24a constitute a centrifugal fan 29. As the fan 29 rotates with the rotation of the drive pulley 24, outside air is taken in from the housing intake opening 21a.

The CVT intake duct 27 extends forward below the substantially center in the vehicle width direction of the seat 6 to reach a bonnet space Z located in front of the riding space S. In the present description, as illustrated in FIG. 1, the bonnet space Z is defined in the front-rear direction as a range that is in front of a dashboard 90 that delimits a front end of the riding space S and has the front end located at a front end portion of the vehicle body 1, and is defined in the vertical direction as a range in which the upper end is a bonnet 91 and the lower end is a vehicle body frame 2 and a wheel house. In the CVT intake duct 21, a proximal end portion 27a is connected to the housing intake opening 21a, and an intake opening 27b located at a distal end portion extending upward in the bonnet space Z is opened upward above the seat cushion 62. In other words, the intake opening 27b is open on the side opposite to the exhaust system 50 with respect to the engine 10, the riding space S is located between the intake opening 27b and the engine 10, and at least the seat 6 and the dashboard 90 are located as shielding objects between them. In this manner, the intake opening 27b easily takes in cold air without being affected by heat from the engine 10 and the exhaust system 50.

Figure 3:
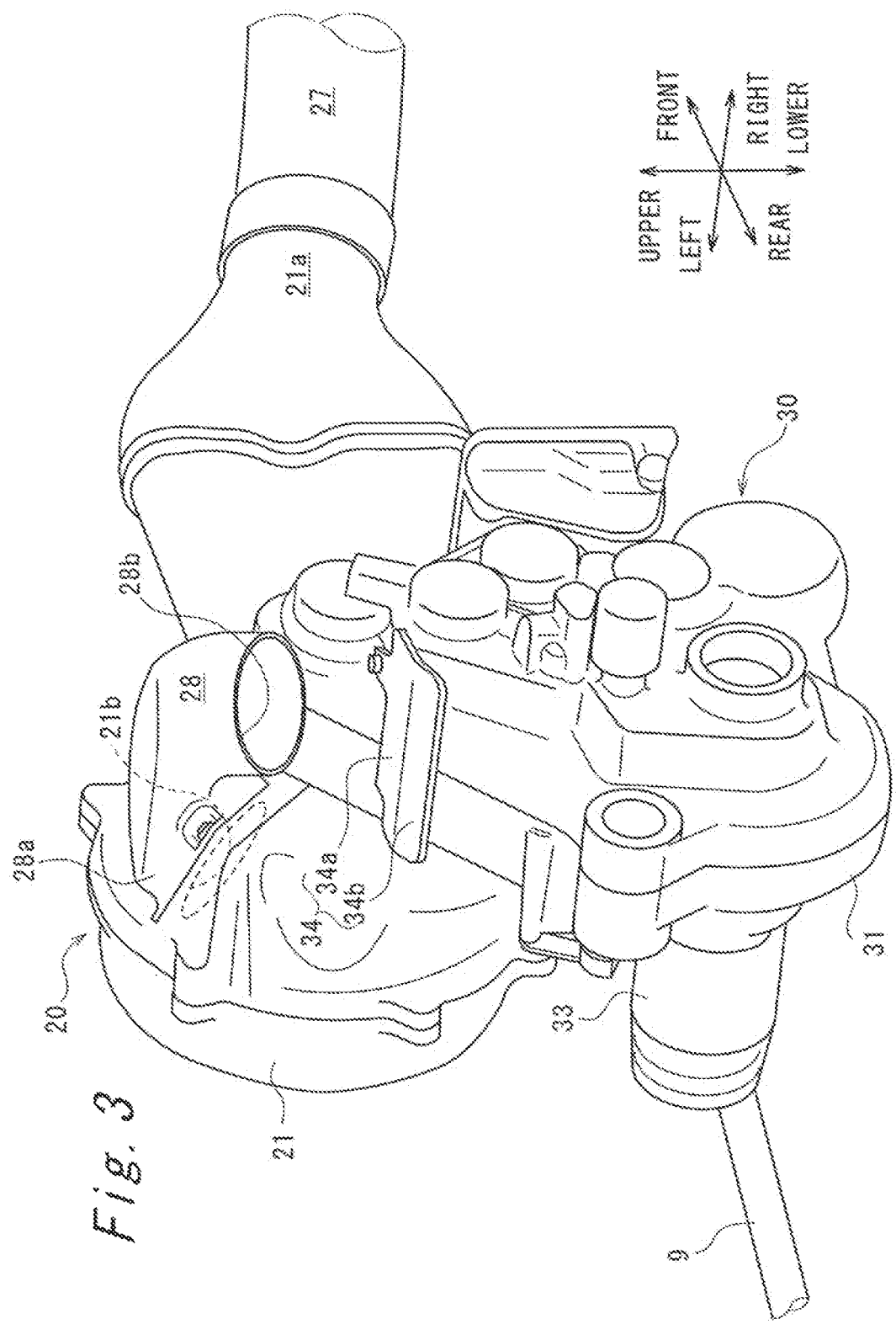
FIG. 3 is a perspective view of an area around a transmission as viewed from the rear.
Figure 6:
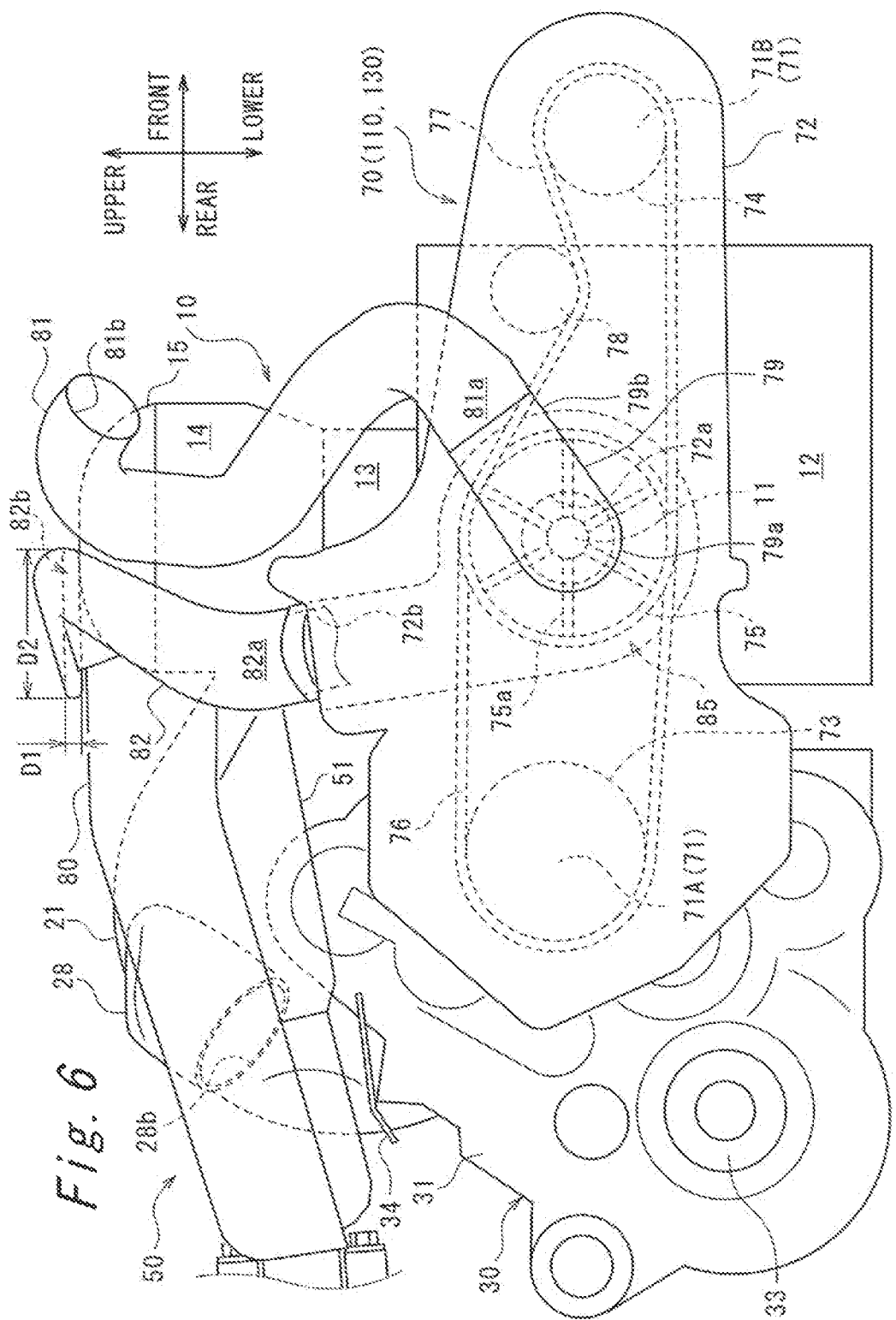
FIG. 6 is a right side view of an area around the engine.

As illustrated in FIG. 2, the CVT exhaust duct 28 projects from the CVT housing 21 in a direction to be closer to the engine 10 in the vehicle width direction. FIG. 3 is a perspective view of an area around the transmission 30 as viewed from the rear and from the inner side in the vehicle width direction. As illustrated in FIG. 3, the CVT exhaust duct 28 has a proximal end portion 28a connected to the housing exhaust opening 21b, and an exhaust opening 28b located at a distal end portion extending in a curved manner downward toward the inside in the vehicle width direction, and is opened in a direction inclined rearward and inward (right side) in the vehicle width direction toward the lower side, above the transmission 30. As shown in FIG. 6, the CVT exhaust duct 28 is located below the upper end portion of the CVT housing 21.

As illustrated in FIG. 2, the intake opening 27b of the CVT intake duct 27, the fan 29, and the exhaust opening 28b of the CVT exhaust duct 28 constitute an air guide that guides outside air toward the exhaust system 50. Note that the exhaust opening 28b of the CVT exhaust duct 28 may have a dimension in the vertical direction smaller than a dimension in the horizontal direction. In this manner, outside air exhausted through the CVT exhaust duct 28 is exhausted to a wide range in the horizontal direction toward the exhaust system 50 while being throttled in the vertical direction at the exhaust opening 28b so that a flow velocity is increased, and the cooling performance of the exhaust system 50 can be further improved.

As shown in FIG. 1, the transmission 30 is located behind the engine 10 and adjacent to the right side of the CVT 20. The transmission 30 includes a transmission housing 31 that constitutes an outer shell, and a transmission input shaft 32 and a transmission output shaft 33 accommodated inside the transmission housing 31.

The transmission input shaft 32 extends in the vehicle width direction in an upper front portion of the transmission housing 31, and is connected to the CVT output shaft 23 so as to be able to transmit power. That is, the transmission input shaft 32 is located above and behind the crankshaft 11. The transmission output shaft 33 extends in the vehicle width direction in a lower rear portion of the transmission housing 31. That is, the transmission output shaft 33 is located below and behind the transmission input shaft 32. In the transmission 30, the drive rotation inputted from the CVT output shaft 23 is transmitted to the transmission input shaft 32, has the rotation speed changed, and is outputted from the transmission output shaft 33.

As illustrated in FIG. 3, a drive shaft 9 for driving the rear wheel 4 is connected to the transmission output shaft 33. An upper portion of the transmission housing 31 is inclined downward toward the rear.

The transmission 30 further includes a baffle plate (wind guiding plate) 34. The baffle plate 34 is attached to the upper portion of the transmission housing 31. More specifically, the baffle plate 34 is located below the exhaust opening 28b of the CVT exhaust duct 28 on an upper portion of the transmission housing 31. That is, the exhaust opening 28b of the CVT exhaust duct 28 faces the baffle plate 34 from above. The baffle plate 34 has a first surface portion 34a extending in the horizontal direction and a second surface portion 34b extending in a direction inclined downward toward the rear in a manner continuous with a rear edge of the first surface portion 34a.

The baffle plate 34 receives the air discharged from the CVT exhaust duct 28 on the first surface portion 34a and guides the air rearward via the second surface portion 34b. As will be described later, the exhaust system 50 is located behind the baffle plate 34, and the exhaust system 50 is cooled by the air guided by the baffle plate 34. Note that the baffle plate 34 is not necessarily required, and the direction of the exhaust opening 28b of the CVT exhaust duct 28 may be set such that discharged air is directly supplied toward the exhaust system 50.

As illustrated in FIG. 2, the intake system 40 has an intake pipe 41, an air cleaner 42, and an engine intake duct 43. The intake pipe 41 has an intake manifold 44, a throttle body 45, and an air box 46 in this order from the downstream side of the intake path.

The intake manifold 44 has, on the downstream side, four independent port portions 44a connected to the intake ports 14a of the cylinder head 14 and has, on the upstream side, a collecting port portion 44b in which the independent port portion 44a are integrated into one. As illustrated in FIG. 1, the independent port portion 44a extends in a direction inclined downward toward the rear. Referring back to FIG. 2, the collecting port portion 44b extends in the left-right direction in an upstream side end portion (front end in the diagram) of the independent port portions 44a. The collecting port portion 44b has an entrance in a left end portion.

The throttle body 45 is connected to the left side of the intake manifold 44. Specifically, the throttle body 45 is connected to a left end portion of the collecting port portion 44b of the intake manifold 44. In the present embodiment, the throttle body 45 adjusts the amount of air flowing into the engine 30 by being electronically controlled, and thereby the rotation speed of the engine 10 is controlled.

The air box 46 is disposed below the front of the throttle body 45 and below a seat back 61 of the driver's seat 6A. The air box 46 is connected to left side of the throttle body 45 with an air pipe 47 interposed between them. The air box 46 acts as a resonator that reduces intake noise in the intake system 40 or a surge tank that suppresses a sudden fluctuation in the amount of air flowing into the engine 10.

The air cleaner 42 is connected to the air box 46 with an air pipe 48 interposed between them. The air cleaner 42 is disposed below the seat 6 on the front side of the engine 10 with space between them. Specifically, the air cleaner 42 is disposed below a seat cushion 62 of the driver's seat 6A. More specifically, the air cleaner 42, in top view, has at least the left half overlapping the seat cushion 62 of the driver's seat 6A.

As shown in FIG. 1, in the vertical direction, an upper end portion of the air cleaner 42 is located below an upper end portion of the cylinder head 14. Specifically, the upper end portion of the air cleaner 42 is located at substantially the same height as a straight line W1 that passes through a lower end portion of the cylinder head 14 and extends horizontally in the front-rear direction. Further, as shown in FIG. 2, in the left-right direction, the air cleaner 42 has a left end portion located on the left side of the engine 10 and further on the right side than a left end portion of the CVT 20, and a right end portion located further on the right side than a left end portion of the engine 10.

As illustrated in FIG. 1, a downstream side end portion of the engine intake duct 43 is connected to the lower rear end of the left side surface of the air cleaner 42. As illustrated in FIG. 2, the engine intake duct 43 extends below the seat 6 to the right, curves forward below the substantial center in the vehicle width direction of the seat 6, and extends forward below the CVT intake duct 27 to reach the bonnet space Z. The front opening tip of the engine intake duct 43 extends upward and opens upward on the right side of the intake opening 27b of the CVT intake duct 27 in the bonnet space Z. However, the positional relationship between the opening tips is not limited to one in the present embodiment.

In the intake system 40, the intake air taken in through the engine intake duct 43 is filtered by the air cleaner 42 and then reaches the throttle body 45 via the air box 46. In the throttle body 45, the intake air is adjusted to the air flow rate according to the output required by the engine 10 and reaches the intake manifold 44. In the intake manifold 44, the intake air is distributed from the collecting port portion 44b to the independent port portions 44a and introduced into the intake ports 14a.

Figure 4:
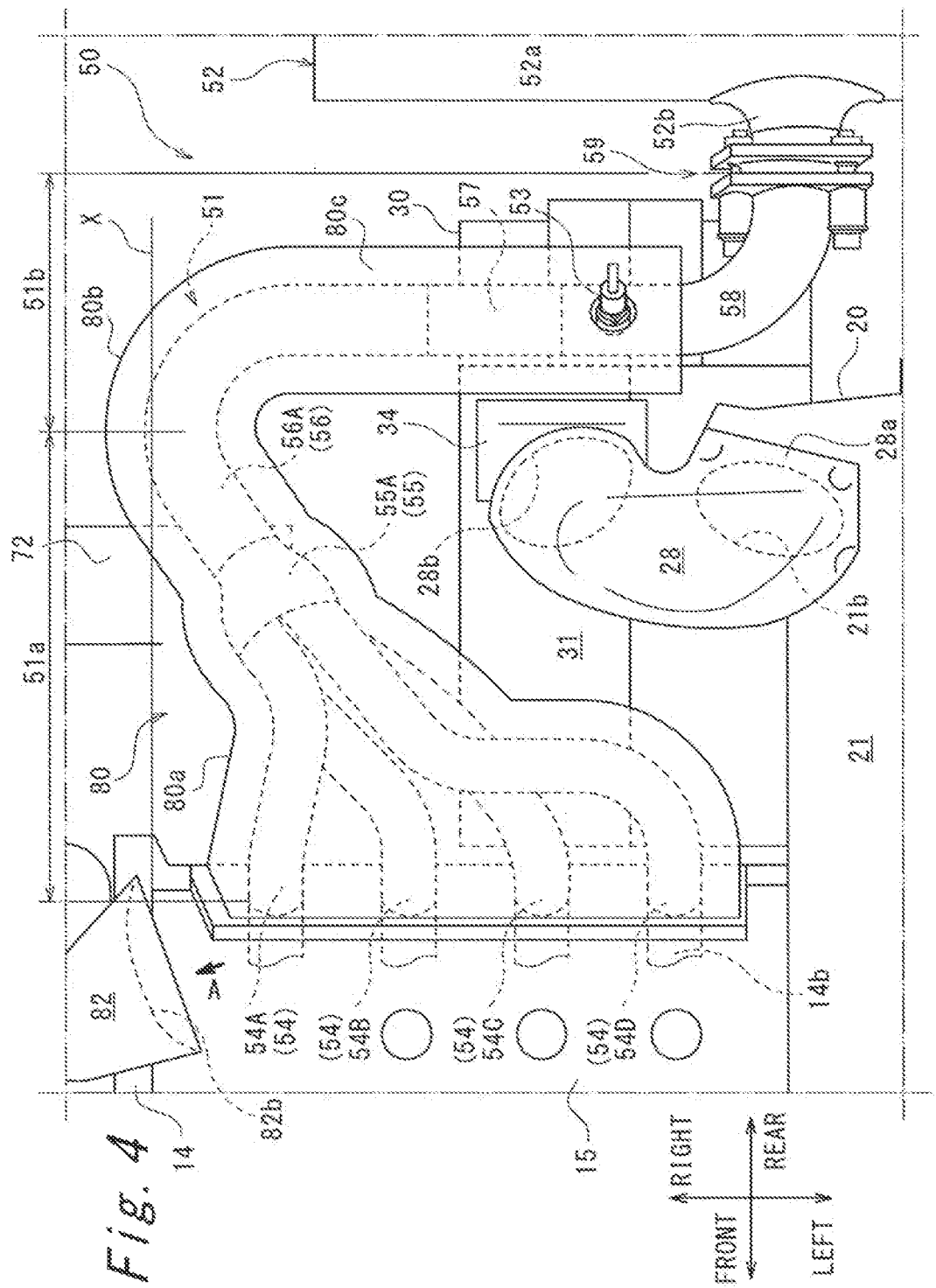
FIG. 4 is an enlarged view of an area around an exhaust pipe in FIG. 2.

FIG. 4 is a top view illustrating an area around an exhaust pipe 51 in an enlarged manner in the powertrain mechanism 7. As shown in FIG. 4, the exhaust system 50 includes the exhaust pipe 51, an exhaust muffler 52, and an exhaust gas sensor 53. The exhaust pipe 51 has four independent exhaust pipes 54, a first collecting pipe 55, a first exhaust pipe 56, a second collecting pipe 57, and a second exhaust pipe 58 in this order from the upstream side. Furthermore, the exhaust system 50 includes a heat cover 80 that covers substantially the entire periphery of the exhaust pipe 51 from above. The heat cover 80 includes a first portion 80a covering the periphery of the independent exhaust pipe 54 and the first collecting pipe 55 from above, a second portion 80b covering the periphery of the first exhaust pipe 56 from above, and a third portion 80c covering the periphery of the second collecting pipe 57 and the second exhaust pipe 58 from above. The heat cover 80 has a planar upper surface extending in a substantially horizontal direction over four of the independent exhaust pipes 54 so as to cover four of the independent exhaust pipes 54 of the first portion 80a from above.

The four independent exhaust pipes 54 are connected to the four exhaust ports 14b of the cylinder head 14. The four independent exhaust pipes 54 include a first independent exhaust pipe 54A, a second independent exhaust pipe 54B, a third independent exhaust pipe 54C, and a fourth independent exhaust pipe 54D disposed in this order from the right side. The fourth independent exhaust pipe 54D is connected to the exhaust port 14b located on the side closest to the CVT 20 among the four exhaust ports 14b, and constitutes the CVT side exhaust pipe.

Figure 5:
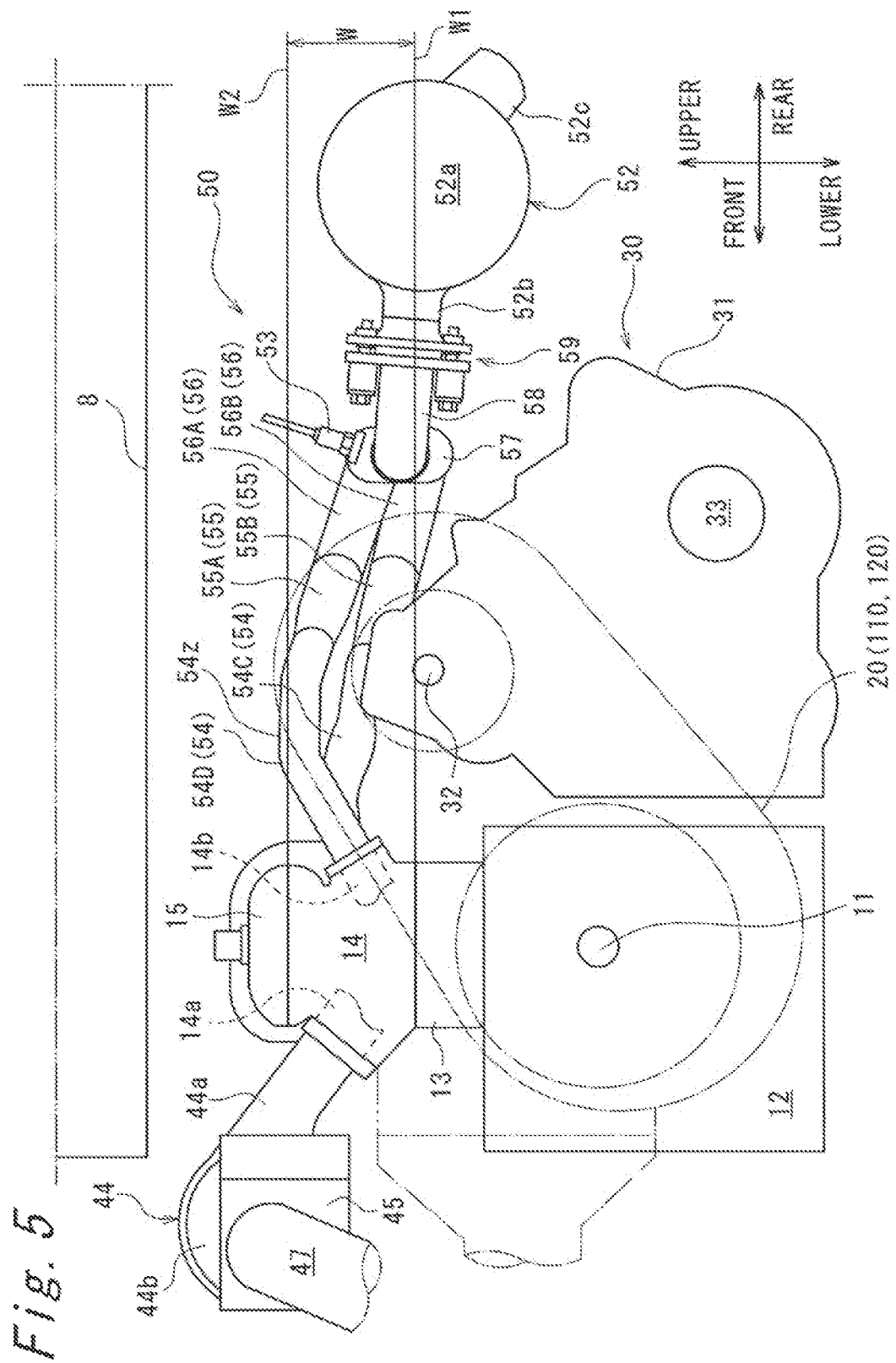
FIG. 5 is an enlarged view of an area around an engine in FIG. 1.

FIG. 5 is a left side view illustrating an area around the exhaust system 50 in the powertrain mechanism 7. Note that, in FIG. 5, the CVT 20 is indicated by a chain double-dashed line, and the heat cover 80 is omitted. As illustrated in FIG. 5, a first independent exhaust pipe 54A and a fourth independent exhaust pipe 54D extend in a direction inclined upward toward the rear, and have a top portion 54z in a substantially central portion in the front-rear direction.

The first collecting pipe 55 is composed of an upper first collecting pipe 55A located on the upper side and a lower first collecting pipe 55B located on the lower side. As illustrated in FIG. 4, the first collecting pipe 55 is located in a manner corresponding to the rear side of a right end portion of the engine 10, and has an upstream side end portion opening in a direction inclined to the left toward the front.

The first independent exhaust pipe 54A extends rearward from the exhaust port 14b, curves to the left and then curves to the right, and is connected to an upstream side end portion of the first collecting pipe 55. The second to fourth independent exhaust pipes 54B to 54D curve to the right from the exhaust port 14b toward the rear to reach the first collecting pipe 55. In particular, the fourth independent exhaust pipe 54D curves approximately at right angles to the opposite side to the CVT 20, that is, to the right, immediately after extending rearward from an end portion connected to the exhaust port 14b.

As illustrated in FIG. 5, the first independent exhaust pipe 54A and the fourth independent exhaust pipe 54D are connected to an upstream side end portion of the upper first collecting pipe 55A. The second independent exhaust pipe 54B and the third independent exhaust pipe 54C are connected to an upstream side end portion of the lower first collecting pipe 55B. The second and third independent exhaust pipes 54B, 54C and the lower first collecting pipe 55B are adjacent to the right side of an upper end portion of the transmission 30.

The first exhaust pipe 56 is composed of an upper first exhaust pipe 56A connected to a downstream side end portion of the upper first collecting pipe 55A and a lower first exhaust pipe 56B connected to a downstream side end portion of the lower first collecting pipe 55B, and are connected to an upstream side end portion of the second collecting pipe 57, respectively. As illustrated in FIG. 4, each of the two first exhaust pipes 56 extends from a downstream side end portion of the corresponding first collecting pipe 55 in a direction inclined to the right toward the rear, then curves to the left and extends to the left substantially parallel to the vehicle width direction, and is connected to an upstream side end portion of the second collecting pipe 57.

The second collecting pipe 57 is located in the direction in which the exhaust opening 28b of the CVT exhaust duct 28 is directed. As a result, air discharged from the CVT exhaust duct 28 is guided by the baffle plate 34 and supplied to the third portion 80c of the heat cover 80 covering the periphery of the second collecting pipe 57. A temperature of the second collecting pipe 57 is likely to rise as two of the first exhaust pipes 56 gather, and thus a surface temperature of the third portion 80c of the heat cover 80 is likely to rise. However, the temperature rise is effectively suppressed by outside air discharged from the CVT 20. In this manner, heat transfer of temperature from the exhaust system 50 to the cargo bed 8 is suppressed.

The second exhaust pipe 58 is connected to a downstream side end portion of the second collecting pipe 57. The second exhaust pipe 58 extends to the left side substantially parallel to the vehicle width direction from a downstream side end portion of the second collecting pipe 57, then curves rearward behind a left end portion of the engine 10, and is connected to an upstream side end portion of the exhaust muffler 52 with a spherical joint 59 interposed between them. The exhaust gas sensor 53 is attached to an upstream side portion of the second exhaust pipe 58.

As described above, the exhaust pipe 51 curves to the right toward the rear, then extends to the rear of a right end portion of the engine 10, curves to the left, and extends to the rear of a left end portion of the engine 10. As a whole, the exhaust, pipe 51 extends in a substantially S-shape. Among the exhaust pipe 51, a portion located on the upstream side and extending to the right toward the rear constitutes an upstream side exhaust pipe 51a, and a portion connected to a rear end portion of the upstream side exhaust pipe 51a and extending to the left side toward the rear constitutes a downstream side exhaust pipe 51b. In other words, the upstream side exhaust pipe 51a is a front half portion of the exhaust pipe 51. The downstream side exhaust pipe 51b is a rear half portion of the exhaust pipe 51.

That is, in the present embodiment, the upstream side exhaust pipe 51a includes a portion that extends in the direction inclined to the right side toward the rear and is located on the far right of the two first exhaust pipes 56, in addition to the four Independent exhaust pipes 54 and the two first collecting pipes 55. Further, the downstream side exhaust pipe 51b includes a portion extending substantially parallel to the vehicle width direction by curving to the left toward the rear in a manner continuous with a downstream side end portion of the upstream side exhaust pipe 51a of the two first exhaust pipes 56, the second collecting pipe 57, and the second exhaust pipe 58.

The upstream side exhaust pipe 51a has, in the top view, a portion that passes through a region that is further on the right than a straight line X extending in the front-rear direction through a right end portion of the cylinder head cover 15, and is located further on the left than a right end portion of an auxiliary case 72 described later.

As illustrated in FIG. 5, the exhaust muffler 52 has a cylindrical muffler main body 52a extending in the vehicle width direction, the muffler inlet portion 52b protruding forward at a left end portion, and a tail pipe 52c protruding rightward from a right end portion and curves rearward. The muffler inlet portion 52b constitutes a connection portion connected to a downstream side end portion of the exhaust pipe 51. In other words, in the exhaust system 50, the exhaust pipe 51 and the exhaust muffler 52 are disposed so as to be side by side in the front-rear direction, do not overlap in the vertical direction, and are different in position in the front-rear direction.

Here, the exhaust system 50 is disposed at substantially the same height as the cylinder head 14 in the vertical direction. Specifically, the exhaust pipe 51 is generally located in a region W where the cylinder head 14 is projected rearward. The region W is defined as a region in the vertical direction between the straight line W1 that passes through a lower end portion of the cylinder head 14 and extends to the rear and a straight line W2 that passes through an upper end portion of the cylinder head 14 and extends to the rear. In the vertical direction, the top portion 54z that is highest of the exhaust pipe 51 is located at substantially the same height as the straight line W2. Further, an upper end portion of the exhaust muffler 52 is located at substantially the same height as the straight line W2 in the vertical direction.

As illustrated in FIG. 2, in the left-right direction, the engine auxiliary unit 70 is disposed adjacent to the side opposite to the CVT 20 of the engine 10, that is, on the right side. FIG. 6 is a right side view illustrating an area around the engine 10. As shown in FIG. 6, the engine auxiliary unit 70 has an engine auxiliary 71 and an auxiliary case 72 that accommodates the engine auxiliary 71. The auxiliary case 72 covers the engine auxiliary 71 accommodated inside from the outer side in the vehicle width direction, which prevents a foreign matter such as water or sand from directly splashing on the engine auxiliary 71.

The engine auxiliary 71 includes an alternator 71A disposed behind the engine 10 and an air conditioner compressor 71B disposed in front of the engine 10. The alternator 71A and the air conditioner compressor 71B have driven pulleys 73 and 74 in a right end portion. Further, inside the auxiliary case 72, a drive pulley 75 fixed to a right end portion of the crankshaft 11, a first belt 76 and a second belt 77 wound over between the drive pulley 75 and each of the driven pulleys 73 and 74, and a tensioner 78 that adjusts the tension of the second belt 77 are disposed.

Therefore, the alternator 71A and the air conditioner compressor 71B are rotationally driven as the crankshaft 11 rotates.

An auxiliary case 72 has a case intake opening 72a that opens to the right on a side wall portion and a case exhaust opening 72b that opens upward on an upper wall portion. Specifically, the case intake opening 72a faces a right end portion of a crankshaft 11a. The case exhaust opening 72b is located corresponding to a rear surface of a cylinder head 14 in the front-rear direction. A case intake duct 81 is connected to the case intake opening 72a via an intake fitting 79. A case exhaust duct 82 is connected to the case exhaust opening 72b.

The intake fitting 79 includes a proximal end portion 79a connected to the case intake opening 72a, and a distal end portion 79b bent 90° from the proximal end portion 79a and extending in a direction inclined upward toward the front.

The case intake duct 81 has a proximal end portion 81a connected to the distal end portion 79b of the intake fitting 79, and has an intake opening 81b at a distal end portion extending upward in an S shape from the proximal end portion 81a. The intake opening 81b opens in a direction inclined downward toward the front on the front side of the engine 10, on the rear side of the seat back 61, and above the seat cushion 62. In other words, the intake opening 81b opens to the side opposite to the exhaust system 50 with respect to the engine 10. In the present embodiment, a drive pulley 75 has a plurality of fins 75a that rotate integrally, and the fins 75a constitute a centrifugal fan 85. When the fan 85 rotates with the rotation of the drive pulley 75, outside air is taken into the inside of the auxiliary case 72 from the case intake duct 81.

The case exhaust duct 82 has a proximal end portion 82a connected to the case exhaust opening 72b, has a top portion bent from the proximal end portion 82a and extending in a direction inclined to the front toward the upper side is bent leftward, and has an exhaust opening 82b at a distal end portion. The exhaust opening 82b is open above the engine 10 in a direction inclined backward from the right front side to the lower side with respect to the first portion 80a of the heat cover 80, that is, the exhaust pipe 51. Specifically, the case exhaust duct 82 opens from the right front side toward the first portion 80a of the heat cover 80. The first portion 80a of the heat cover 80 is effectively cooled by air discharged from the case exhaust duct 82. As the first portion 80a of the heat cover 80 is cooled, the independent exhaust pipe 54 and the first collecting pipe 55 located inside the first portion 80a are also cooled indirectly. Furthermore, since outside air is supplied to the heat cover 80 from the front, not only the first portion 80a but also the second portion 80b and the third portion 80c located on the downstream side are cooled, and the exhaust pipe 51 located inside the second portion 80b and the third portion 80c is also cooled. This also suppresses the heat transfer of temperature from the exhaust system 50 to the cargo bed 8. Furthermore, as described above, although an upper surface of the first portion 80a of the heat cover 80 is formed in a planar shape, deposition of foreign materials on the first portion 80a is effectively suppressed by outside air discharged from the case exhaust duct 82.

Figure 7:
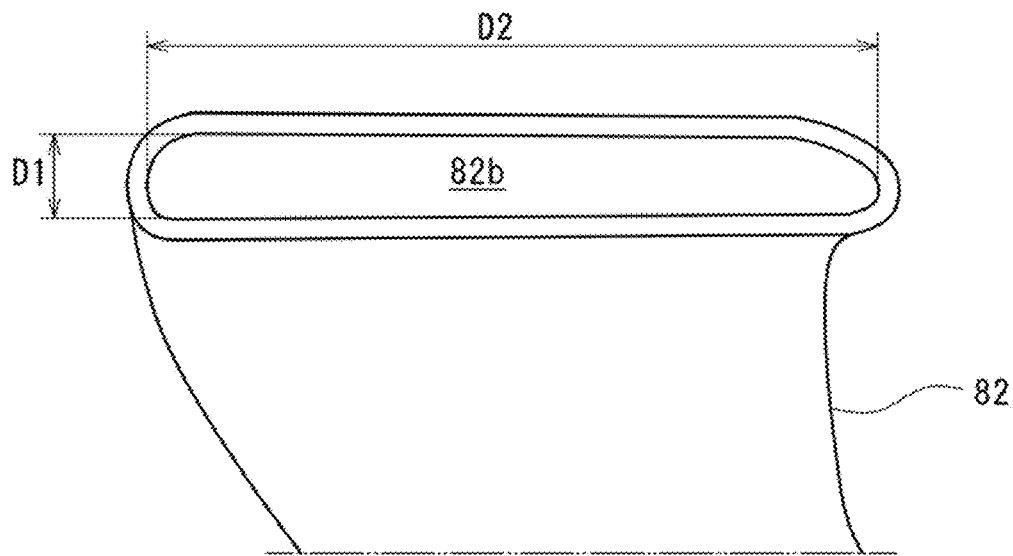
FIG. 7 is a front view of an exhaust opening of a case exhaust duct as viewed in a direction of arrow A in FIG. 4.

FIG. 7 is a front view of the exhaust opening 82b of the case exhaust duct 82 as viewed in a direction of arrow A in FIG. 4. As illustrated in FIG. 7, in the exhaust opening 82b of the case exhaust duct 82, a dimension D1 in the vertical direction is smaller than a dimension D2 in the horizontal direction. In this manner, outside air discharged through the case exhaust duct 82 is throttled in the vertical direction at the exhaust opening 82b so that a flow velocity is increased, and is discharged to a wide range in the horizontal direction toward the heat cover 80.

Therefore, the intake opening 81b of the case intake duct 81, the fan 85, and the exhaust opening 82b of the case exhaust duct 82 constitute the air guide that guides outside air toward the exhaust system 50, particularly, the exhaust pipe 51 and the heat cover 80.

Here, as illustrated in FIG. 1, in the powertrain mechanism 7 according to the present embodiment, at least a part of each of the transmission 30, the air cleaner 42, the exhaust pipe 51, and the exhaust muffler 52 is disposed within a region Y in which the engine 10 is projected in the front-rear direction.

The region Y has an upper end portion constituted by a horizontal plane Y1 passing through an upper end portion of the cylinder head cover 15, and has a lower end portion constituted by a horizontal plane Y2 passing through a lower end portion of the crankcase 12. Further, as shown in FIG. 2, the region Y has a left end portion constituted by an extending surface Y3 that passes through a left end portion of the engine 10 and extends in the front-rear direction, and a right end portion constituted by a vertical plane Y4 that passes through a right end portion of the engine 10 and extends in the front-rear direction. Note that, in a case where an additional part such as an oil pan is mounted on a lower end portion of the crankcase 12, the horizontal plane Y2 is defined by a horizontal plane passing through a lower end portion of the additional part.

According to the vehicle 100 according to the embodiment described above, an effect described below is achieved.

(1) The intake opening 27b of the CVT intake duct 27, the fan 29, and the exhaust opening 28b of the CVT exhaust duct 28 constitute the air guide that guides outside air toward the exhaust system 50, particularly, the exhaust pipe 51 and the heat cover 80. Similarly, the intake opening 81b of the case intake duct 81, the fan 85, and the exhaust opening 82b of the case exhaust duct 82 constitute the air guide that guides outside air toward the exhaust system 50, particularly, the exhaust pipe 51 and the heat cover 80. As a result, since the exhaust pipe 51 and the heat cover 80 are cooled by outside air guided from the air guide, heat damage due to the exhaust pipe 51 to the surroundings thereof is suppressed. In particular, since the exhaust system 51 located on the upstream side of the exhaust muffler 52 is cooled, the exhaust system 51 can be more effectively cooled, and the heat damage to the surroundings of the exhaust system 51 is more effectively suppressed. Furthermore, a deposit that may be deposited on the heat cover 80 is blown off and removed by outside air guided from the air guide.

(2) The heat cover 80 that covers the periphery of the exhaust pipe 51 is arranged on the exhaust pipe 51. Even in a case where the exhaust pipe 51 is covered with the heat cover 80, deposition of foreign materials on the heat cover 80 is effectively suppressed by outside air supplied from the air guide toward the heat cover 80.

(3) The engine 10 includes the cylinder head 14 having a plurality of exhaust ports 14b, and the exhaust pipe 51 includes a plurality of the independent exhaust pipes 54 connected to the plurality of the exhaust ports 14b, two of the first collecting pipes 55 connected to downstream side end portions of the plurality of the independent exhaust pipes 51 to collect the independent exhaust pipes 54, two of the first exhaust pipes 56, the second collecting pipe 57, and the second exhaust pipe 58. As a result, the above effect is suitably exhibited in the exhaust pipe 51 that is directly connected to the engine 10 and tends to have a relatively high temperature as compared with the exhaust muffler 52.

(4) In the CVT 20, the air guide includes the intake opening 27b into which outside air is introduced, the fan 29 that draws outside air into the intake opening 27b, and the exhaust opening 28b through which outside air drawn by the fan 29 is discharged toward the exhaust pipe 51 and the heat cover 80. Further, in the engine auxiliary unit 70, the air guide includes the intake opening 81b through which outside air is introduced, the fan 85 that draws outside air into the intake opening 81b, and the exhaust opening 82b through which outside air drawn by the fan 85 is discharged toward the exhaust pipe 51 and the heat cover 80. As a result, the air guide can be easily configured using outside air that is discharged after cooling the inside of the CVT 20 and the engine auxiliary unit 70.

(5) The engine 10 has the crankshaft 11, and the fan 29 is constituted by a plurality of the fins 24a of the drive pulley 24 that is indirectly connected via the CVT input shaft 22 connected to the crankshaft. Further, the fan 85 includes a plurality of the fins 75a of the pulley 75 directly connected to the crankshaft 11. Since the fans 29 and 85 are rotationally driven with the rotation of the crankshaft 11, other drive sources for driving the fans 29 and 85 are not required.

(6) The CVT 20 that is connected to the engine 10 and changes a speed of a rotational output output from the engine 10 is further included. The CVT 20 includes the CVT housing 21 that is an outer shell, the CVT input shaft 22 connected to the crankshaft 11, the drive pulley 24 that is attached to the CVT input shaft 22 and rotates integrally with the CVT input shaft 22, the CVT intake duct 27 that has the intake opening 27b at a distal end portion and has the proximal end portion 27a connected to the CVT housing 21, the fan 29 that is connected to the drive pulley 24 and rotates integrally with the drive pulley 24 to draw outside air into the CVT housing 21 via the CVT intake duct 27, and the CVT exhaust duct 28 through which outside air drawn into the CVT housing 21 is discharged, the CVT exhaust duct 28 having the exhaust opening 28b at a distal end portion and the proximal end portion 28a connected to the CVT housing 21. As a result, outside air discharged from the CVT housing 21 can be guided to the exhaust, pipe 51 and the heat cover 80 via the CVT exhaust duct 27.

(7) The auxiliary case 72 that covers an end portion of the crankshaft 11 protruding from the engine 10, the case intake duct 81 having the intake opening 81b at a distal end portion and having the proximal end portion 81a connected to the auxiliary case 72, the fan 85 that is connected to the end portion of the crankshaft 11 and draws outside air into the auxiliary case 72 via the case intake duct 81 by rotating integrally with the crankshaft 11, and the case exhaust duct 82 through which outside air drawn into the auxiliary case 72 is discharged, the case exhaust duct 82 having the exhaust opening 82b at a distal end portion and having the proximal end portion 82a connected to the auxiliary case 72 are included. As a result, outside air discharged from the auxiliary case 72 covering the end portion of the crankshaft 11 can be guided to the exhaust pipe 51 and the heat cover 80 via the case exhaust duct 82. For example, in a case where the auxiliary case 72 has a waterproof structure and accommodates the engine auxiliary 71 driven by the crankshaft 11 inside, outside air discharged from the case exhaust duct 82 can be guided to the exhaust pipe 51 and the heat cover 80 while the engine auxiliary 71 is cooled by outside air drawn in by the fan 85 from the case intake duct 81.

(8) The seat 6 including the seat cushion 62 on which an occupant is seated, and the intake openings 27b and 81b are located above the seat cushion 62. As a result, since the intake openings 27b and 81b are located above the seat cushion 62, water intrusion into the CVT intake duct 27 and the case intake duct 81 is suppressed.

(9) The intake openings 27b and 81b open on the side opposite to the exhaust pipe 51 with respect to the engine 10. As a result, since the intake openings 27b and 81b take in outside air from a position away from the exhaust pipe 51, outside air warmed by the exhaust pipe 51 is hardly taken in, and cooling performance is easily improved.

(10) The intake opening 81b is located behind the seat 6. As a result, entry of foreign materials from the front into the intake opening 81b is prevented by the seat 6 located in front of the intake opening 81b.

(11) The exhaust openings 28b and 82b open to the rear of a vehicle. As a result, outside air is discharged from the front toward the rear. In the present embodiment, since the riding space S is located in front of the exhaust pipe 51, outside air blown to the exhaust pipe 51 and the heat cover 80 and raised in temperature is discharged to the rear of the vehicle without being blown to the riding space S, so that the temperature rise of the riding space S is suppressed.

(12) The exhaust openings 28b and 82b open downward toward the exhaust pipe 51 and the heat cover 80. As a result, a deposit that may be deposited on the exhaust pipe 51 and the heat cover 80 can be effectively blown off and easily removed from the exhaust pipe 51 and the heat cover 80.

(13) In the exhaust openings 28b and 82b, the dimension D1 in the vertical direction is smaller than the dimension D2 in the horizontal direction. As a result, the outside air discharged from the exhaust openings 28b and 82b is supplied to a wide range in the horizontal direction of the exhaust pipe 51 find the heat cover 80 while being throttled so that a flow velocity is increased. For this reason, the exhaust pipe 51 and the heat cover 80 can be effectively cooled, and deposits can be effectively removed.

(14) The exhaust pipe 51 and the heat cover 80 are located below the cargo bed 8. As a result, in a utility vehicle in which the exhaust pipe 51 and the heat cover 80 are located below the cargo bed 8, the above effect is suitably exhibited.

(15) The engine 10 is located behind the seat 6. As a result, in a utility vehicle in which the engine 10 is located behind the seat 6, the above effect is suitably exhibited.

Further, the utility vehicle 100 according to the embodiment described above exerts an effect below in addition to the above effect produced by the air guide.

(a) Since at least a part of the transmission 30, the intake pipe 41, the air cleaner 42, the exhaust pipe 51, and the exhaust muffler 52 is located in the region Y where the engine 10 is projected in the front-rear direction, the powertrain mechanism 7 of the vehicle is compactly disposed in the vehicle width direction and the vertical direction. In this manner, the vehicle 100 is compactly configured in the vehicle width direction and the vertical direction.

(b) Since the seat 6 is located further to the front than the engine 10, the transfer of heat generated from the engine 10 to the seat 6 is suppressed. In this manner, the discomfort for a person seated in the seat 6 caused by the heat from the engine 10 is suppressed.

(c) Since the vehicle 100 is a utility vehicle, the above effect of the disclosure is preferably exhibited. That is, it is easy to make the height of the cargo bed low while making the dimensions of the utility vehicle in the vehicle width direction compact.

(d) Since the exhaust port 14b is provided in a rear portion of the cylinder head 14, when the exhaust system related parts, for example the exhaust muffler 52, which have a relatively high temperature, are disposed away from the seat 6 so as to suppress heat transfer to the seat 6 side, space occupied by a pipe, for example, the exhaust pipe 51 connecting these parts and the cylinder head 14 can be reduced. In this manner, it is easy to compactly configure the powertrain mechanism 7 in the vertical direction and the left-right direction while suppressing the discomfort for an occupant.

(e) Since the air cleaner 42 is disposed under the seat 6, the air cleaner 42 can be disposed by utilizing the dead space Under the seat 6, and the intake pipe 41 that connects the cylinder head 14 and the air cleaner 42 disposed on the front side of the cylinder head 14 can be configured to be short.

(f) Since the positions of the exhaust pipe 51 and the exhaust muffler 52 are different in the front-rear direction, the exhaust muffler 52 can be easily disposed further above as compared with the case where the exhaust pipe 51 and the exhaust muffler 52 are disposed overlapping in the vertical direction. In this manner, it is easy to suppress the intrusion of water into the engine 10 through the tail pipe 52c of the exhaust muffler 52, and it is easy to suppress the contact of water to the exhaust pipe 51, which affects the engine performance by being cooled.

(g) Since the top portion 54z of the exhaust pipe 51 is located at almost the same height as the horizontal plane W2 passing through an upper end portion of the cylinder head 14 in the vertical direction, it is easy to suppress the contact of the exhaust pipe 51 with water more while the powertrain mechanism 7 is compactly configured in the vertical direction.

(h) Since an upper end portion of the exhaust muffler 52 is located at substantially the same height as the horizontal plane W2 passing through an upper end portion of the cylinder head 14 in the vertical direction, it is easy to dispose the exhaust muffler 52 further above. In this manner, it is further easier to suppress water intrusion into the exhaust muffler 52 while keeping the powertrain mechanism 7 compact in the vertical direction.

(i) Since a front end upper portion of the transmission 30 is adjacent to the left side of the upstream side exhaust pipe 51a (front half portion) of the exhaust pipe 51, the transmission 30 can be easily configured to be long in the vertical direction while interference with the exhaust pipe 51 is prevented. In this manner, the transmission 30 can be compactly configured in the front-rear direction.

(j) Since the fourth independent exhaust pipe 54D curves to the opposite side, that is right side, to the CVT 20 immediately after the exhaust port 14b, it is easy to configure the exhaust pipe 51 in a manner that interference with the transmission 30 is suppressed. Further, as compared with the case where the exhaust pipe 51 is curved toward the CVT 20 side, it is easy to lengthen the exhaust pipe 51 and improve the engine performance.

(k) Since an upper portion of the transmission 30 is inclined downward toward the rear, it is easier to further configure the exhaust pipe 51 so as to suppress interference with the transmission 30.

(l) Since the CVT exhaust duct 28 is located above the transmission 30 and below an upper end portion of the CVT housing 21, it is easy to compactly arrange the CVT exhaust duct 28 above the transmission 30. In this manner, rising of the height position of the cargo bed 8 is suppressed while the CVT exhaust duct 28 is provided.

(m) Since the engine auxiliary 71 is covered from the vehicle width direction by the auxiliary case 72, the engine auxiliary 71 can be protected from a foreign matter such as water and sand. In particular, the effect of the present disclosure is preferably exhibited in a case where the vehicle travels on a submerged road, an uneven terrain road, and the like.

(n) Since the auxiliary case 72 is provided with the case intake duct 81 and the case exhaust duct 82, the engine auxiliary 71 accommodated in the auxiliary case 72 is effectively cooled.

(o) Since the air cleaner 42 is disposed so as to have the upper end located below the horizontal plane W2 passing through an upper end portion of the cylinder head 14, an increase in the dimension in the vertical direction of the powertrain mechanism 7 can be suppressed and the powertrain mechanism 7 can be easily accommodated in a limited space.

(p) Since the air cleaner 42 is disposed on the front side of the engine 10 so as to extend over from the engine 10 to the CVT 20 in the vehicle width direction, it is easy to increase the capacity of the air cleaner 42. Further, since the air cleaner 42 is located on the inner side, that is right side, in the vehicle width direction than a left end portion of the CVT 20, it is easy to compactly configure the powertrain mechanism 7 as a whole in the vehicle width direction. Therefore, it is easy to secure the mountability of the powertrain mechanism 7 on the vehicle 100 while configuring the air cleaner 42 to be large in the vehicle width direction.

(q) The air cleaner 42 is disposed on the front side with respect to the engine 10 with space between them and is disposed directly under the driver's seat 6A. In this manner, it is easy to suppress heat transfer from the engine 10 to the air cleaner 42. Further, it is easy to access the air cleaner 42 from seat 6 and maintainability is excellent. Further, since the air cleaner 42 is disposed directly under the driver's seat 6A, the space below the passenger seat SB can be configured as, for example, a storage space.

(r) Since the exhaust pipe 51 passes through a region on the outer side, that is right side, in the vehicle width direction than the cylinder head cover 15, it is easy to lengthen the exhaust pipe 51. Further, since the exhaust pipe 51 extends inward, that is left side, in the vehicle width direction than an outer end portion, that is right end portion, in the vehicle width direction of the auxiliary transmission unit 130, it is easy to compactly configure the powertrain mechanism 7 as a whole in the vehicle width direction. That is, deterioration in the mountability of the powertrain mechanism 7 on the vehicle 100 can be suppressed while the exhaust length is lengthened.

(s) The exhaust muffler 52 is connected to a downstream portion of the exhaust pipe 51, and the exhaust muffler 52 has the muffler inlet portion 52b (connection portion) connected to the exhaust pipe 51 on the front surface and in a left end portion. In this manner, the exhaust pipe 51 can be extended in an S-shape, and the length of the exhaust pipe can be easily increased. Further, the exhaust muffler 52 and the exhaust pipe 51 can be easily disposed in the front-rear direction, and the exhaust muffler 52 can be easily disposed so that the upper end is located above the lower end of the exhaust pipe 51. Furthermore, since the exhaust muffler 52 can be disposed behind the exhaust pipe 51, the influence of the temperature due to the exhaust muffler 52 with respect to the engine 10 and other units is suppressed.

Figure 8:
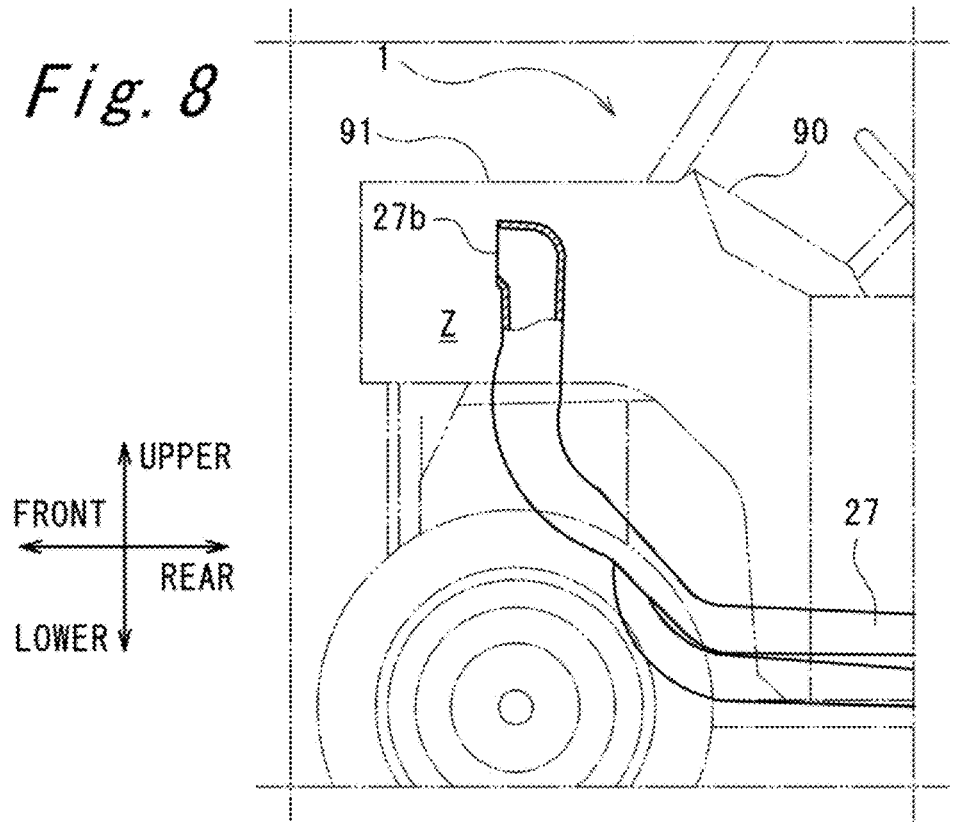
FIG. 8 is a side view of an area around an intake opening of a CVT exhaust duct according to a variation.

In the above embodiment, the case where the intake opening 27*b* of the CVT intake duct 27 and an intake opening of the engine intake duct 43 open upward is described as an example. However, the present disclosure is not limited to this configuration. As illustrated in FIG. 8, the intake opening 27*b* of the CVT intake duct 27 and the intake opening of the engine intake duct 43 may open forward. That is, the intake opening 27*b* of the CVT exhaust duct 27 and the intake opening of the engine intake duct 43 may be configured to open in a direction opposite to the exhaust system 50 with respect to the engine 10, so that it is possible to configure such that cool air is more easily taken in without being affected by heat by the exhaust system 50.

Figure 9:
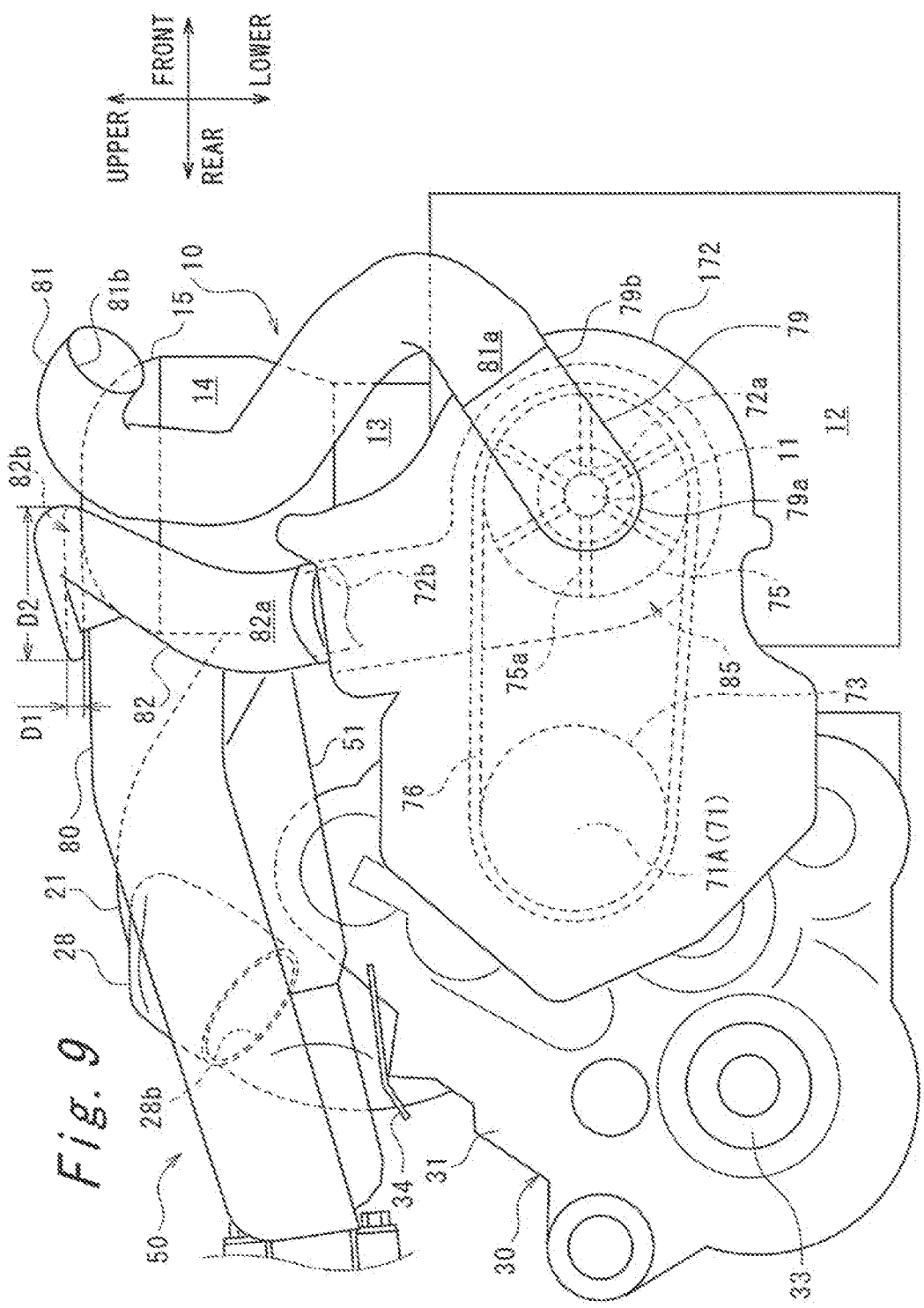
FIG. 9 is a right side view of an area around the engine according to the variation.
Figure 10:
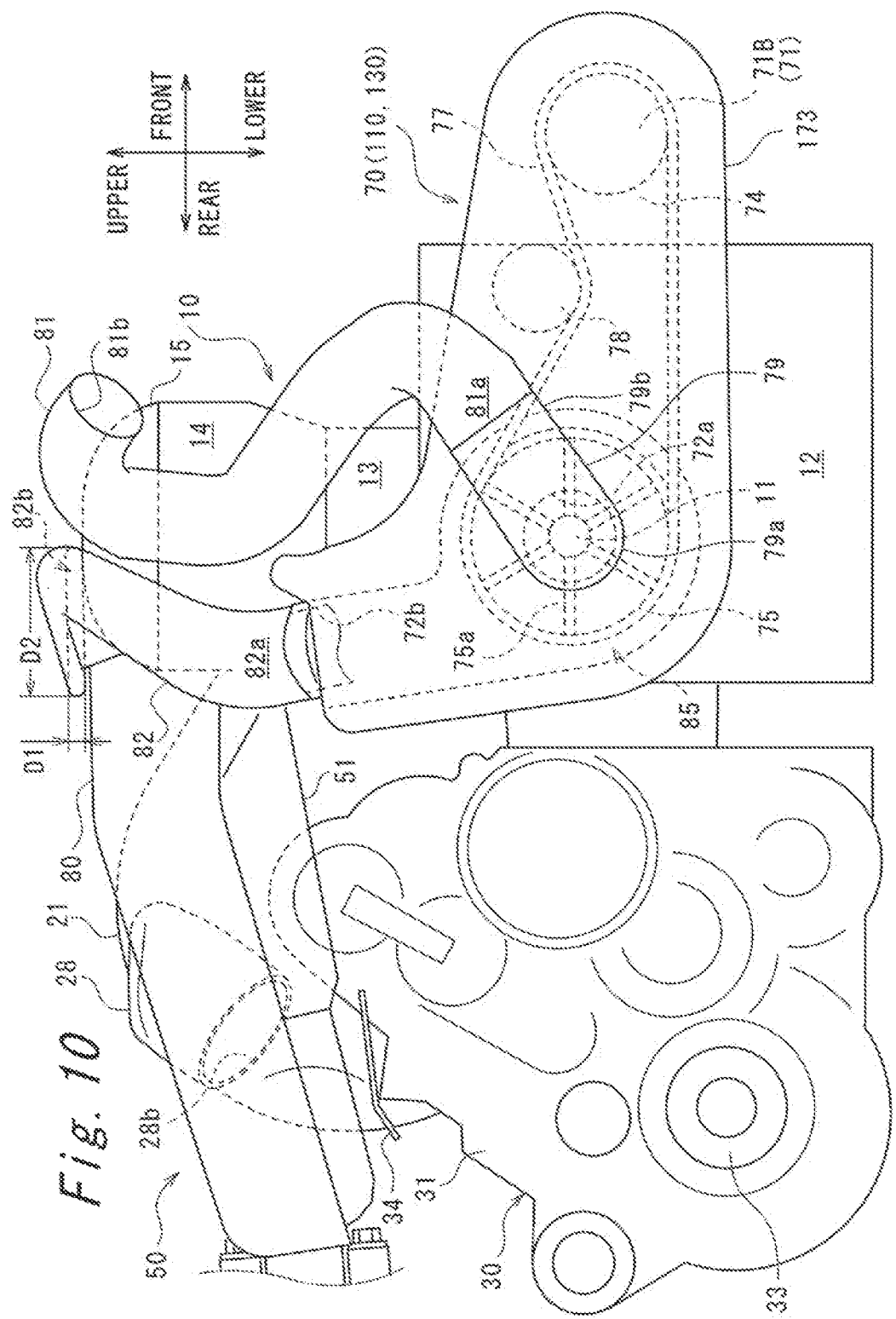
FIG. 10 is a right side view of an area around the engine according to another variation.
Figure 11:
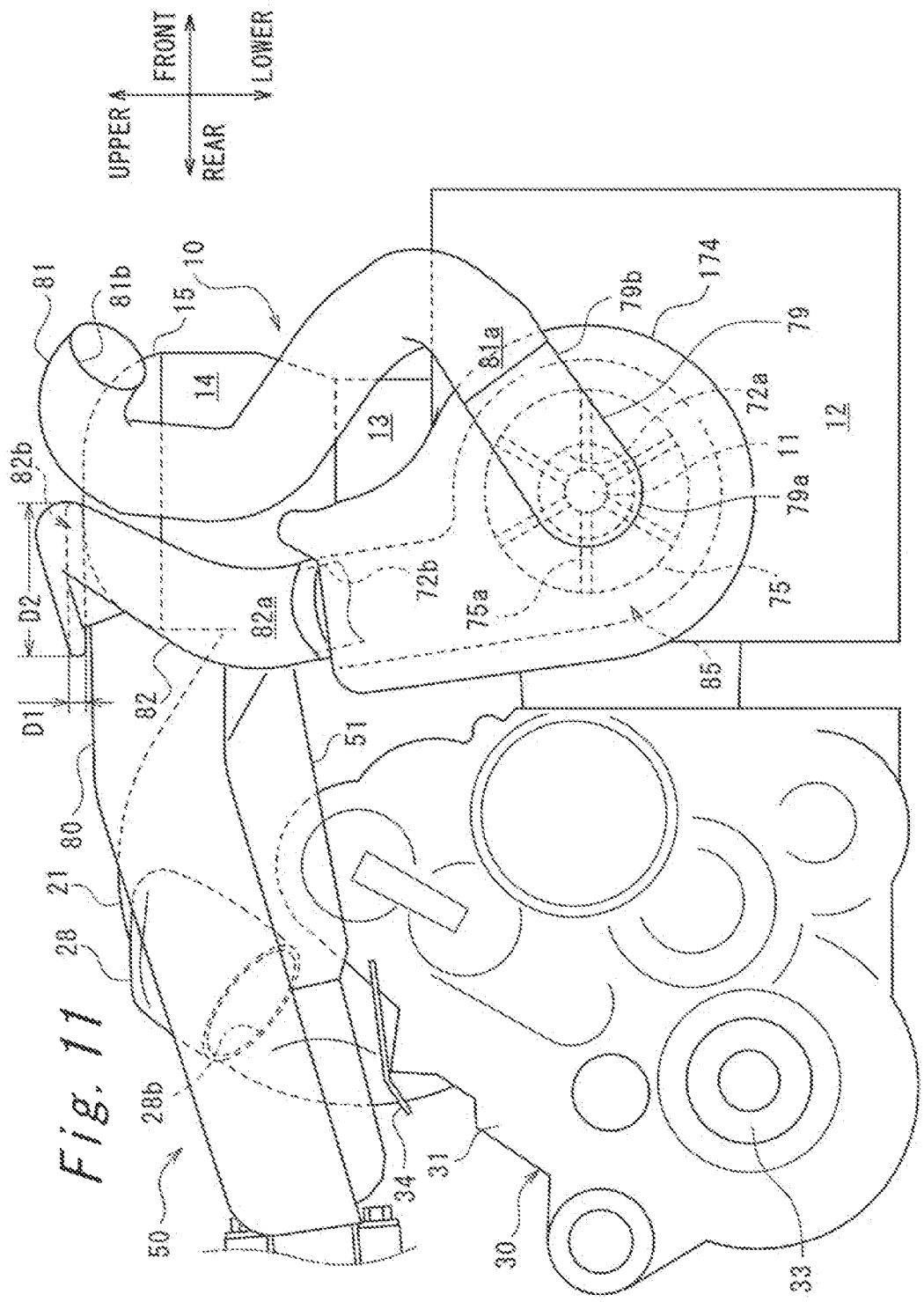
FIG. 11 is a right side view of an area around the engine according to still another variation.

In the above embodiment, the case where the alternator 71A and the air conditioner compressor 71B are accommodated in the auxiliary case 72 is described as an example. However, the present disclosure is not limited to this configuration. For example, as illustrated in FIG. 9, the present disclosure may be applied to a case where an auxiliary case 172 includes the alternator 71A but does not include the air conditioner compressor 71B, and in this case, the auxiliary case 172 is configured to be as large as extending between the fan 85 and the alternator 71A. Similarly, as illustrated in FIG. 10, the present disclosure may be applied to a case where an auxiliary case 173 includes the air conditioner compressor 71B but does not include the alternator 71A, and in this case, the auxiliary case 173 is configured to be as large as extending between the fan 85 and the air conditioner compressor 71B. Furthermore, as illustrated in FIG. 11, the present disclosure may be applied to a case where neither the alternator 71A nor the air conditioner compressor 71B is included in an auxiliary case 174, and in this case, the auxiliary case 174 is configured to be as large as just including the fan 85.

Second Embodiment

Figure 12:
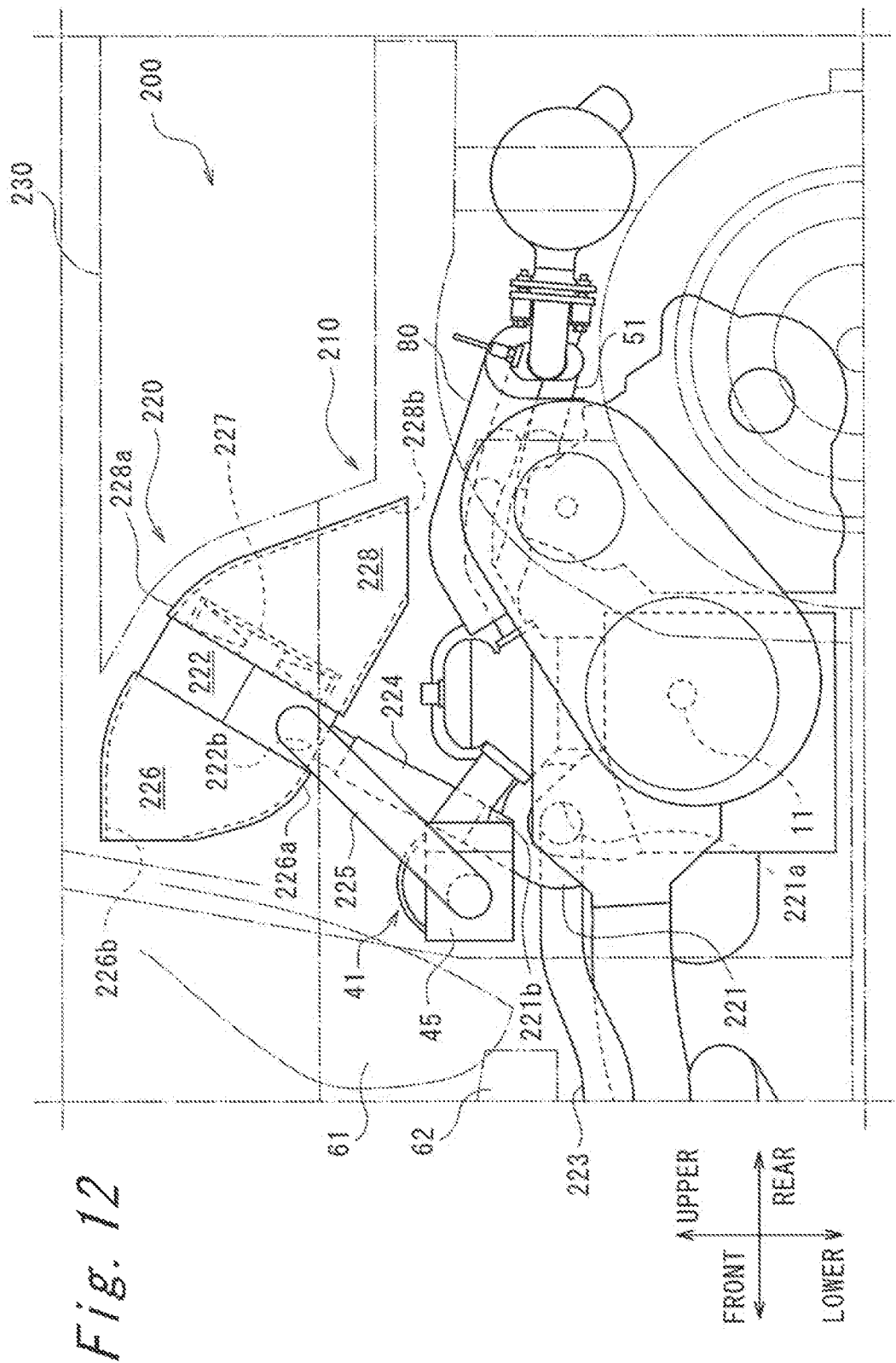
FIG. 12 is a right side view of an area around the engine according to a second embodiment of the present disclosure.

A utility vehicle 200 according to a second embodiment will be described. In description below, the same reference numerals are used for members common to the first embodiment, and description of such members will be omitted. FIG. 12 is an enlarged right side view illustrating an area around an engine 210 of the utility vehicle 200. As illustrated in FIG. 12, the engine 210 includes a supercharging system 220 that supplies compressed air to the intake pipe 41. The supercharging system 220 includes a supercharger 221 and a heat exchanger 222 interposed between the supercharger 221 and the intake pipe 41.

In the present embodiment, the supercharger 221 is a supercharger that is mechanically rotationally driven using the rotation of the crankshaft 11. An inlet 221*a* of the supercharger 221 is connected to the air cleaner 42 via an air hose 223. An outlet 221*b* of the supercharger 221 is connected to an inlet 222*a* of a heat exchanger 222 via an air hose 224. An outlet 222*b* of the heat exchanger 222 is connected to an inlet of a throttle body 45 via an air hose 225. That, is air taken in from the air cleaner 42 through the air hose 223 is supercharged by the supercharger 221, then cooled in the heat exchanger 222, and supplied to the throttle body 45.

Figure 13:
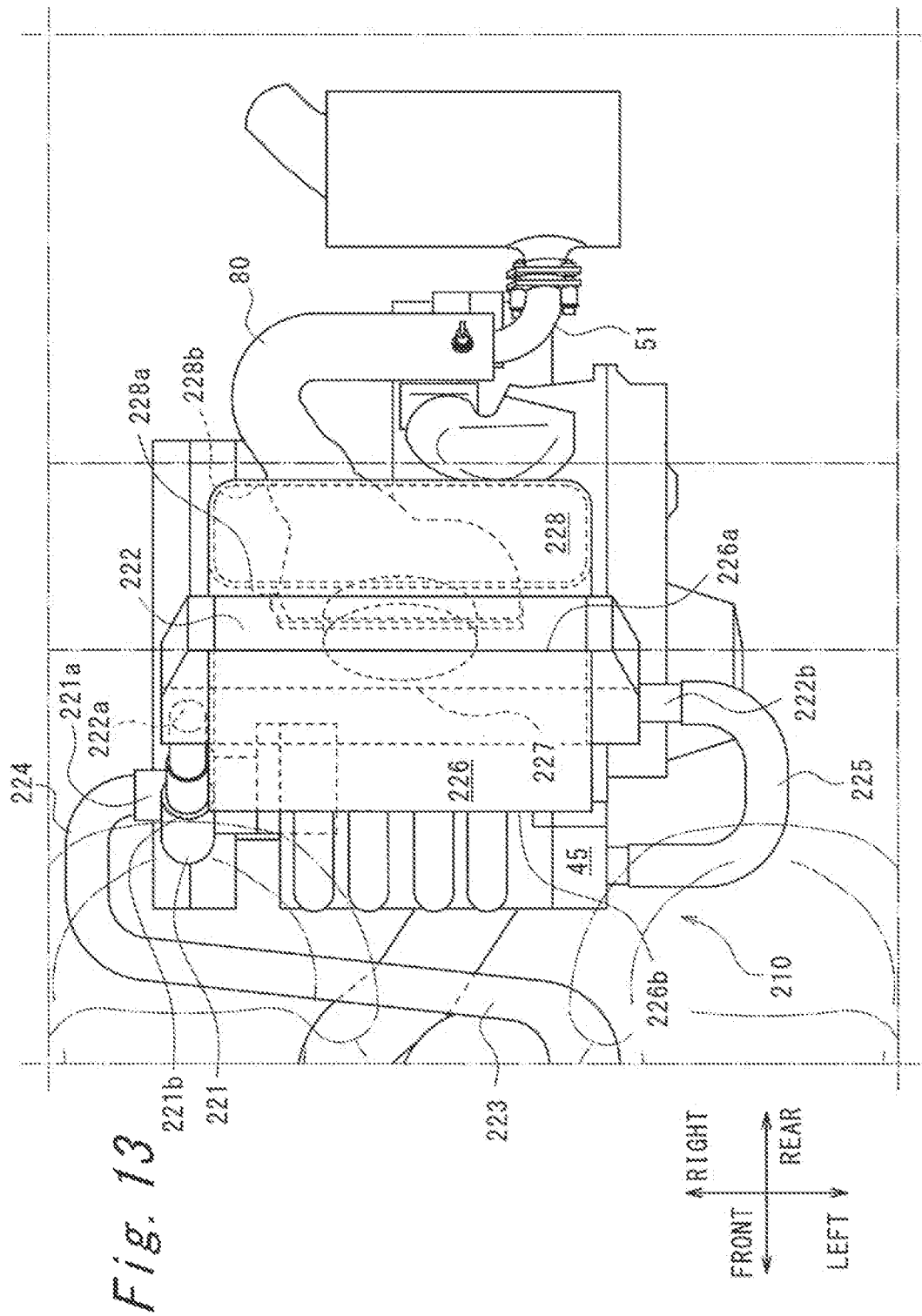
FIG. 13 is a top view of an area around the engine of FIG. 10.

The heat exchanger 222 is arranged above the engine 10 and between the seat 6 and a cargo bed 230 in the front-rear direction. The cargo bed 230 has a shorter front end than the cargo bed 8 of the vehicle 100 according to the first embodiment. FIG. 13 is an enlarged top view illustrating an area around the engine 210 of the utility vehicle 200. Referring also to FIG. 13, the heat exchanger 222 has a horizontally long substantially rectangular parallelepiped shape, and is arranged in a posture in which the thickness direction is directed in a direction inclined downward toward the rear. A width of the heat exchanger 222 in the left-right direction is substantially equal to a width of the engine 210. The heat exchanger 222 exchanges heat between compressed air introduced from the inlet 222*a* and outside air to cool the compressed air, and discharges the compressed air from the outlet 222*b*.

As illustrated in FIG. 12, a heat exchanger inlet duct 226, a fan 227, and a heat exchanger outlet duct 228 are mounted on the heat exchanger 222. The heat exchanger inlet duct 226 has a proximal end portion 226*a* adjacent to a front end of the heat exchanger 222, and has an intake opening 226*b* opening forward at the front end. The intake opening 226*b* opens forward behind the seat back 61 and above the seat cushion 62. The heat exchanger outlet duct 228 has a proximal end portion 228*a* adjacent to a rear end of the heat exchanger 222, and has an exhaust opening 228*b* opening rearward at the rear end. The exhaust opening 228*b* opens in a direction inclined downward toward the rear above the exhaust pipe 51 and the heat cover 80.

The fan 227 is attached to a rear surface of the heat exchanger 222 and is accommodated inside the heat exchanger outlet duct 228. The fan 227 is rotationally driven by an electrically driven motor, and draws outside air toward the heat exchanger 222 via the heat exchanger inlet duct 226 to cause the outside air to pass through the heat exchanger 222 in the front-rear direction. In this manner, intake air heated by being supercharged in the supercharger 221 is cooled by heat exchange with the outside air in the heat exchanger 222. The outside air having passed to the rear through the heat exchanger 222 is guided from the upper side to the rear side with respect to the exhaust pipe 51 and the heat cover 80 from the exhaust opening 228*b* via the heat exchanger outlet duct 228. As a result, outside air having passed through the heat exchanger 222 can be guided to the exhaust pipe 51 and the heat cover 80 via the heat exchanger exhaust duct 228. Accordingly, the air guide can be easily configured.

In the above embodiment, the case where the supercharger 221 is a supercharger has been described as an example, but the forced induction device may be configured as an exhaust turbocharger.

Third Embodiment

Figure 14:
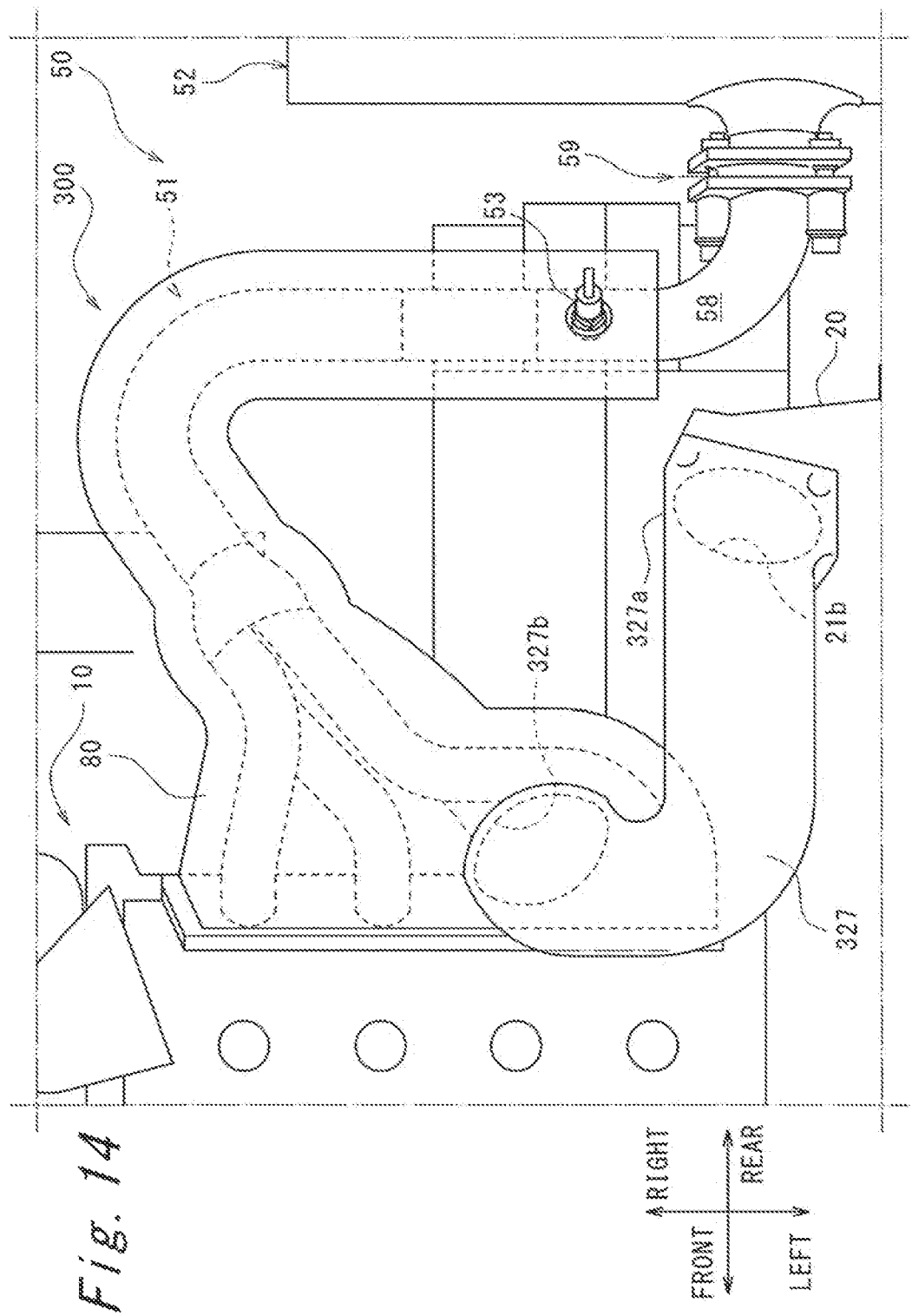
FIG. 14 is a top view of the engine according to a third embodiment.

A utility vehicle 300 according to a third embodiment will be described. In description below, the same reference numerals are used for members common to the first embodiment, and description of such members will be omitted. FIG. 14 is an enlarged right side view illustrating an area around the engine 10 of the utility vehicle 300. As illustrated in FIG. 14, the utility vehicle 300 differs from the utility vehicle 100 according to the first embodiment in a configuration of a CVT exhaust duct 327.

The CVT exhaust duct 327 extends forward from a proximal end portion 327a and is curved by approximately 180° inward in the vehicle width direction, that is, to the right above the exhaust pipe 51 and a front end of the heat cover 80. An exhaust opening 327b at a distal end portion of the CVT exhaust duct 327 opens in a direction inclined downward from the upper side toward the rear side with respect to the exhaust pipe 51 and the heat cover 80. That is, the exhaust pipe 51 and the heat cover 80 can be cooled by outside air discharged from the exhaust opening 327b of the CVT exhaust duct 327, and deposition of foreign materials on the heat cover 80 can be suppressed. The intake opening 27b of the CVT intake duct 27, the fan 29, and the exhaust opening 327b of the CVT exhaust duct 327 also constitute the air guide. The exhaust opening 327b of the CVT exhaust duct 327 may have a dimension in the vertical direction smaller than a dimension in the horizontal direction. In this manner, outside air exhausted through the CVT exhaust duct 327 is exhausted to a wide range in the horizontal direction toward the heat cover 80 while being throttled in the vertical direction at the exhaust opening 327b so that a flow velocity is increased, and the cooling performance of the heat cover 80 and the exhaust system 50 can be further improved.

One or a plurality of the various air guide described in the first to third embodiments may be appropriately combined.

In the above embodiment, the case where the air box 46 is interposed between the throttle body 45 and the air cleaner 42 is described as an example. However, the air box 46 is not necessarily needed. That is, the throttle body 45 and the air cleaner 42 may be configured to be directly connected by an air pipe. Further, in the above embodiment, the case where the throttle body 45 is arranged at an inlet of the intake manifold 44 and an air amount is adjusted by a single throttle is as an example. However, the present disclosure is not limited to this configuration. For example, an air box may be arranged instead of the intake manifold, a throttle may be arranged in each independent port portion connecting the air box and each of the intake port 14a, and the air amount may be adjusted by each throttle in each of the independent port portions.

Further, in the above embodiment, the case where the exhaust pipe 51 and the exhaust muffler 52 are directly connected is described as an example. However, another exhaust pipe may be interposed between the exhaust pipe 51 and the exhaust muffler 52, so that the exhaust pipe 51 and the exhaust muffler 52 are configured to be indirectly connected.

In the above embodiment, the case where the rotational torque output from the engine 10 is changed in velocity by the CVT 20 and the transmission 30 is described as an example. However, a dual clutch transmission (DCT) may be mounted instead of the CVT 20 and the transmission 30, and the velocity may be changed by the DCT, or a DCT may be mounted instead of the CVT 20, and the velocity may be changed by the DCT and the transmission 30.

What is claimed is:

1. A utility vehicle comprising:
   an engine;
   an exhaust pipe through which exhaust gas is discharged from the engine, the exhaust pipe being connected to the engine;
   a continuously variable transmission (CVT) that is connected to the engine and changes a speed of a rotational output output from the engine; and
   an air guide that guides outside air toward the exhaust pipe, wherein
   the air guide includes:
   an intake opening through which outside air is introduced;
   a fan that draws outside air into the intake opening; and
   an exhaust opening through which outside air drawn in by the fan is discharged toward the exhaust pipe,
   the engine includes a crankshaft,
   the fan is directly or indirectly connected to the crankshaft, and is rotationally driven with rotation of the crankshaft, and
   the air guide and the CVT are respectively positioned on opposite sides of the engine.

2. The utility vehicle according to claim 1, wherein a heat cover that covers a periphery of the exhaust pipe is attached to the exhaust pipe.

3. The utility vehicle according to claim 1, wherein
   the engine includes a cylinder head including a plurality of exhaust ports, and
   the exhaust pipe includes:
   a plurality of independent exhaust pipes connected to the plurality of exhaust ports; and
   a collecting pipe connected to a downstream side end portion of the plurality of independent exhaust pipes to collect the independent exhaust pipes.

4. The utility vehicle according to claim 1, wherein
   the CVT includes:
   a CVT housing that is an outer shell;
   a CVT input shaft connected to the crankshaft;
   a drive pulley that is attached to the CVT input shaft and rotates integrally with the CVT input shaft;
   a CVT intake duct that has an intake opening at a distal end portion and has a proximal end portion connected to the CVT housing;
   a fan that is connected to the drive pulley and rotates integrally with the drive pulley to draw outside air into the CVT housing via the CVT intake duct; and
   a CVT exhaust duct through which outside air drawn into the CVT housing is discharged, the CVT exhaust duct having an exhaust opening at a distal end portion, through which outside air drawn into the CVT housing by the fan of the CVT is discharged toward the exhaust pipe, and a proximal end portion connected to the CVT housing.

5. The utility vehicle according to claim 1, further comprising:
   a case that covers an end portion of the crankshaft protruding from the engine;
   a case intake duct that has the intake opening at a distal end portion and has a proximal end portion connected to the case;
   the fan that is connected to the end portion of the crankshaft and draws outside air into the case via the case intake duct by rotating integrally with the crankshaft; and
   a case exhaust duct through which outside air drawn into the case is discharged, the case exhaust duct having the exhaust opening at the distal end portion and having the proximal end portion connected to the case.

6. The utility vehicle according to claim 1, further comprising:
   an intake pipe that is connected to the engine and takes in intake air to the engine;
   a heat exchanger that is provided in the intake pipe and cools intake air to the engine;
   an intake opening through which outside air is taken into the heat exchanger;
   a fan that draws outside air toward the heat exchanger via the intake opening; and an exhaust opening through which outside air having passed through the heat exchanger is discharged toward the exhaust pipe.

7. The utility vehicle according to claim 1, further comprising a seat including a seat cushion on which an occupant is seated, wherein the intake opening is located above the seat cushion.

8. The utility vehicle according to claim 1, wherein the intake opening opens on a side opposite to the exhaust pipe with respect to the engine.

9. The utility vehicle according to claim 1, further comprising a seat, wherein the intake opening is located behind the seat.

10. The utility vehicle according to claim 1, wherein the exhaust opening opens to a rear of a vehicle.

11. The utility vehicle according to claim 1, wherein the exhaust opening opens downward toward the exhaust pipe.

12. The utility vehicle according to claim 1, wherein the exhaust opening has a dimension in a vertical direction smaller than a dimension in a horizontal direction.

13. The utility vehicle according to claim 1, further comprising a cargo bed, wherein the exhaust pipe is located below the cargo bed.

14. The utility vehicle according to claim 1, further comprising a seat, wherein the engine is located behind the seat.

15. The utility vehicle according to claim 2, wherein the exhaust opening of the air guide is directed towards the heat cover.

\* \* \* \* \*